United States Patent
Kato et al.

(10) Patent No.: US 6,184,267 B1
(45) Date of Patent: *Feb. 6, 2001

(54) OIL-BASED INK FOR PREPARING PRINTING PLATE BY INK JET PROCESS AND METHOD FOR PREPARING PRINTING PLATE BY INK JET PROCESS

(75) Inventors: Eiichi Kato; Sadao Osawa; Kazuo Ishii, all of Shizuoka (JP)

(73) Assignee: Fuji Photo Film Co., Ltd., Kanagawa (JP)

( * ) Notice: Under 35 U.S.C. 154(b), the term of this patent shall be extended for 0 days.

This patent is subject to a terminal disclaimer.

(21) Appl. No.: 09/009,692

(22) Filed: Jan. 20, 1998

(30) Foreign Application Priority Data

| Jan. 17, 1997 | (JP) | 9-019696 |
| Feb. 28, 1997 | (JP) | 9-061770 |
| Mar. 18, 1997 | (JP) | 9-084434 |
| Dec. 19, 1997 | (JP) | 9-351562 |

(51) Int. Cl.⁷ .......................... C09D 11/02; C09D 11/10; G03G 13/28
(52) U.S. Cl. ........................... 523/160; 430/49
(58) Field of Search ................... 523/160, 161; 430/49; 347/100, 54, 55, 103, 107

(56) References Cited

U.S. PATENT DOCUMENTS

| 4,997,807 | * 3/1991 | Mukoyoshi et al. ............... 503/227 |
| 5,035,971 | 7/1991 | Kato et al. |
| 5,041,352 | 8/1991 | Kato et al. |
| 5,043,241 | 8/1991 | Kato et al. |
| 5,049,468 | 9/1991 | Kato et al. |
| 5,100,751 | 3/1992 | Kato et al. |
| 5,112,716 | 5/1992 | Kato et al. |
| 5,298,357 | * 3/1994 | Hattori et al. ...................... 430/115 |
| 5,582,106 | * 12/1996 | Kanda et al. ....................... 101/462 |
| 5,589,312 | * 12/1996 | Horie et al. ........................ 430/115 |
| 5,714,250 | * 2/1998 | Kato et al. ......................... 428/328 |
| 5,730,787 | * 3/1998 | Kasai et al. ........................ 106/2 |
| 5,738,013 | * 4/1998 | Kellett .............................. 101/463.1 |
| 5,837,753 | * 11/1998 | Caputo ............................. 523/161 |

OTHER PUBLICATIONS

Leach, R.H. and Pierce, R.J.; The Printing Ink Manual, Blueprint, London (p. 63), 1993.*

* cited by examiner

*Primary Examiner*—Vasu Jagannathan
*Assistant Examiner*—Callie E. Shosho
(74) *Attorney, Agent, or Firm*—Sughrue, Mion, Zinn, Macpeak & Seas, PLLC

(57) ABSTRACT

An oil-based ink for a printing plate by an ink jet process comprising spraying an oil-based ink comprising at least resin particles dispersed in a nonaqueous carrier liquid having an electric resistance of $10^9$ Ωcm or more and a dielectric constant of 3.5 or less on a water-resistant support having a lithographically printable hydrophilic surface to dropwise from a nozzle form an image, wherein the resin particles dispersed are polymer particles obtained by polymerization granulation of a solution comprising (i), (ii) and (iii): (i) at least one monofunctional monomer (A) which is soluble in a nonaqueous solvent which is at least miscible with the nonaqueous carrier liquid and becomes insoluble therein by polymerization; (ii) (ii-a) at least one monomer (B) which is copolymerizable with the monomer (A), or (ii-b) at least one monofunctional macromonomer (MA) having a weight average molecular weight of $2 \times 10^4$ or less in which a polymerizable double bond group is combined with only one end of a main chain of a polymer comprising a repeating unit corresponding to a monomer; and (iii) at least one resin for dispersion stabilization (P) which is a polymer comprising a repeating unit and is soluble in the nonaqueous solvent, the polymer being crosslinked at a part of its main chain thereof, and a method for preparing a printing plate by an ink jet process using the ink.

3 Claims, 2 Drawing Sheets

OIL-BASED INK FOR PREPARING PRINTING PLATE BY INK JET PROCESS AND METHOD FOR PREPARING PRINTING PLATE BY INK JET PROCESS

FIELD OF THE INVENTION

The present invention relates to an oil-based ink for preparing a printing plate by an ink jet process, and a method for preparing a printing plate by an ink jet process using it. More particularly, the present invention relates to an oil-based ink excellent in redispersibility, stability, image reproducibility and printability (press life), and a method for preparing a printing plate by an ink jet process using it.

BACKGROUND OF THE INVENTION

With recent developments in business machines and progress in office automation, in the field of light printing, offset lithographic systems have been widely applied in which printing process is conducted, namely images are formed, on direct imaging lithographic printing plate precursors comprising water-resistant supports having provided thereon image receiving layers having hydrophilic surfaces.

Conventional printing plate precursors for direct imaging lithographic printing comprise supports formed of paper or plastic films which are subjected to water-resistant treatments having provided thereon image accepting layers (or image receiving layers) containing inorganic pigments, water-soluble resins and water resistance imparting agents. Methods are known in which lipophilic images are formed on such direct imaging lithographic printing plate precursor with typewriters or by hand writing using lipophilic ink, or by transferring images from ink ribbons by heat melting with heat transfer printers, thereby preparing printing plates.

However, the printing plates prepared by such methods are not sufficient in mechanical strength of image areas, so that missing easily takes place in the image areas in printing.

On the other hand, ink jet recording is a recording method low in noise and printable at high speed, and has recently been rapidly popularized.

As such ink jet recording systems, there are proposed various ink jet processes such as a so-called electric field controlling system in which ink is discharged using electrostatic attraction, a so-called drop-on-demand system (pressure pulse system) in which ink is discharged using the oscillation pressure of a piezoelectric element, and a so-called bubble (thermal) system in which ink is discharged using pressure developed by forming bubbles and allowing them to grow by heating at high temperature, and very detailed images can be obtained by these systems.

In these ink jet recording systems, aqueous ink using water as a main solvent, and oil-based ink using an organic solvent as a main solvent are generally used.

It is also carried out that the above-mentioned lithographic printing plate precursors are made with typewriters using ink jet recording systems, and in this case, aqueous ink in which water is used as a dispersing medium is also employed. However, the aqueous ink has the problem that blurs appear in images on precursor materials, or that the picture drawing speed is decreased because of slow drying. In order to reduce such a problem, a method using oil-based ink in which a nonaqueous solvent is used as a dispersing medium is disclosed in JP-A-54-117203 (the term "JP-A" as used herein means an "unexamined published Japanese patent application").

However, this method is also insufficient, because blurs are observed in actual printing process images, furthermore, blurs are developed in printing, and the number of printing sheets is limited to several hundred at the most. Furthermore, such ink has the problem of being liable to clog a nozzle for discharging minute ink droplets which make it possible to obtain printing process images having high resolution.

In the ink jet recording systems, ink is generally discharged from nozzles through filters, so that abnormal discharge of ink is liable to take place by clogging of the nozzles or the filters, changes in fluidity of ink with time, or other various factors.

This abnormal discharge of ink takes place with respect to not only aqueous ink compositions, but also oil-based ink compositions. Various proposals for improving such abnormal discharge of ink have been submitted. For example, in order to prevent the abnormal discharge of ink at the time when oil-based ink compositions are used, it is proposed that the viscosity and the specific resistance of the ink compositions are controlled as described in JP-A-49-50935, for the ink jet recording system of the electric field controlling system. It is further proposed that the dielectric constant and the specific resistance of solvents used in the ink compositions are controlled as described in JP-A-53-29808.

Furthermore, as attempts to prevent clogging of nozzles caused by general oil-based ink for ink jet printers, there are proposed, for example, methods in which the dispersion stability of pigment particles is improved (e.g., JP-A-4-25573, JP-A-5-25413 and JP-A-5-65443) and methods in which specific compounds are contained as ink compositions (e.g., JP-A-3-79677, JP-A-3-64377, JP-A-4-202386 and JP-A-7-109431).

However, when they are used in image formation of lithographic printing plates, all of them are poor in image strength in printing, and printing plates which can satisfy the press life have not been obtained.

SUMMARY OF THE INVENTION

An object of the present invention is to provide an oil-based ink for a printing plate by an ink jet process excellent in redispersibility, storage stability and press life.

Another object of the present invention is to provide an oil-based ink for a printing plate by an ink jet process which makes it possible to print many sheets of printed material having clear images.

A further object of the present invention is to provide an oil-based ink for a printing plate by an ink jet process which does not induce clogging in a nozzle and in the course of ink supply and stabilizes ink discharge.

A still further object of the present invention is to provide a method for preparing a printing plate by an ink jet process using the above-mentioned oil-based ink.

These and other objects of the present invention have been accomplished by the following:
(1) an oil-based ink for a printing plate by an ink jet process comprising spraying an oil-based ink comprising at least resin particles dispersed in a nonaqueous carrier liquid having an electric resistance of $10^9$ Ωcm or more and a dielectric constant of 3.5 or less on a water-resistant support having a lithographically printable hydrophilic surface dropwise from a nozzle to form an image, wherein said resin particles dispersed are polymer particles obtained by polymerization granulation of a solution comprising (i), (ii) and (iii):
(i) at least one monofunctional monomer (A) which is soluble in a nonaqueous solvent which is at least miscible with said nonaqueous carrier liquid and becomes insoluble therein by polymerization;

(ii) (ii-a) at least one monomer (B) represented by the following formula (I-A) which is copolymerizable with said monomer (A), or (ii-b) at least one monofunctional macromonomer (MA) having a weight average molecular weight of $2\times10^4$ or less obtained by combining a polymerizable double bond group represented by the following formula (II-B) with only one end of a main chain of a polymer comprising a repeating unit corresponding to a monomer represented by the following formula (I-B); and (iii) at least one resin for dispersion stabilization (P) which is a polymer comprising a repeating unit represented by the following formula (III), wherein said polymer is crosslinked at a part of its main chain thereof, and said resin (P) is soluble in said nonaqueous solvent:

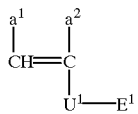

(I-A)

wherein $E^1$ represents an aliphatic group having 8 or more carbon atoms or a substituent having a total number of atoms of 8 or more, provided that hydrogen atoms directly attached to a carbon or nitrogen atom are excluded from the number, represented by the following formula (IV-A):

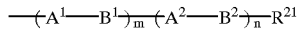

(IV-A)

wherein $R^{21}$ represents a hydrogen atom or an aliphatic group having 1 to 18 carbon atoms;

$B^1$ and $B^2$ are the same or different and each represents —O—, —S—, —CO—, —CO$_2$—, —OCO—, —SO$_2$—, —N($R^{22}$)—, —CON($R^{22}$)—, —N($R^{22}$)CO—, —N($R^{22}$)SO$_2$—, —SO$_2$N($R^{22}$)—, —NHCO$_2$— or —NHCONH—, in which $R^{22}$ has the same meaning as $R^{21}$;

$A^1$ and $A^2$ are the same or different and each represents at least one group selected from a group represented by the following formula (IV-Aa) and a hydrocarbon group having 1 to 18 carbon atoms, which each may be substituted, provided that, in the case of two or more, it represents a combination of the group represented by formula (IV-Aa) and/or the hydrocarbon group:

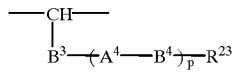

(IV-Aa)

wherein $B^3$ and $B^4$ are the same or different and each has the same meaning as $B^1$ and $B^2$;

$A^4$ represents a hydrocarbon group having 1 to 18 carbon atoms which may be substituted;

$R^{23}$ has the same meaning as $R^{21}$; and m, n and p are the same or different and each represents an integer of 0 to 4, provided that m, n and p are not 0 at the same time;

$U^1$ represents —COO—, —CONH—, —CON($R^{11}$)—, —OCO—, —CONHCOO—, —CH$_2$COO—, —(CH$_2$)$_k$OCO—, —O—, —C$_6$H$_4$—, or —C$_6$H$_4$—COO—, in which $R^{11}$ represents an aliphatic group or a substituent represented by formula (IV-A) described above, and k represents an integer of 1 to 4; and $a^1$ and $a^2$ are the same or different and each represents a hydrogen atom, an alkyl group, a halogen atom, a cyano group, —COO—$R^{12}$ or —CH$_2$COO—$R^{12}$, in which $R^{12}$ represents an aliphatic group:

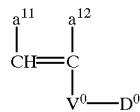

(I-B)

wherein $V^0$ represents —COO—, —OCO—, —(CH$_2$)$_r$COO—, —(CH$_2$)$_r$OCO—, —O—, —SO$_2$—, —CONHCOO—, —CONHCONH—, —CON($D^{11}$)—, —SO$_2$N($D^{11}$)— or a phenylene group, in which $D^{11}$ represents a hydrogen atom or a hydrocarbon group having 1 to 22 carbon atoms, and r represents an integer of 1 to 4;

$a^{11}$ and $a^{12}$ are the same or different and each represents a hydrogen atom, a halogen atom, a cyano group, a hydrocarbon group, —COO—$D^{12}$ or —COO—$D^{12}$ linked through a hydrocarbon group, in which $D^{12}$ represents a hydrogen atom or a hydrocarbon group which may be substituted;

$D^0$ represents a hydrocarbon group having 8 to 22 carbon atoms or a substituent group having a total number of atoms of 8 or more, provided that hydrogen atoms attached to a carbon or nitrogen atom are excluded from the number, represented by the following formula (IV-B):

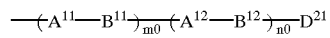

(IV-B)

wherein $D^{21}$ represents a hydrogen atom or an aliphatic group having 1 to 22 carbon atoms;

$B^{11}$ and $B^{12}$ are the same or different and each represents —O—, —CO—, —CO$_2$—, —OCO—, —SO$_2$—, —N($D^{22}$)—, —CON($D^{22}$)—, or —N($D^{22}$)CO—, in which $D^{22}$ has the same meaning as $D^{21}$;

$A^{11}$ and $A^{12}$ are the same or different and each represents at least one group selected from a group represented by the following formula (IV-Ba) and a hydrocarbon group having 1 to 18 carbon atoms, which each may be substituted, provided that, in the case of two or more, it represents a combination of the group represented by formula (IV-Ba) and/or the hydrocarbon group:

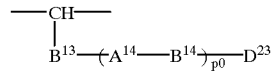

(IV-Ba)

wherein $B^{13}$ and $B^{14}$ are the same or different and each has the same meaning as $B^{11}$ and $B^{12}$;

$A^{14}$ represents a hydrocarbon group having 1 to 18 carbon atoms which may be substituted;

$D^{23}$ has the same meaning as $D^{21}$; and $m^0$, $n^0$ and $p^0$ are the same or different and each represents an integer of 0 to 4, provided that $m^0$, $n^0$ and $p^0$ are not 0 at the same time;

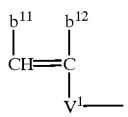

(II-B)

wherein $V^1$ represents —COO—, —CONHCOO—, —CONHCONH—, —CONH— or a phenylene group; and $b^{11}$ and $b^{12}$ are the same or different and each has the same meaning as $a^{11}$ and $a^{12}$ in formula (I-B);

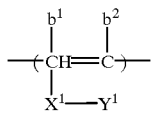

(III)

wherein $X^1$ represents —COO—, —OCO—, —CH$_2$OCO—, —CH$_2$COO—, —O— or —SO$_2$—;

$Y^1$ represents an aliphatic group having 10 to 32 carbon atoms; and $b^1$ and $b^2$ are the same or different and have the same meaning as $a^1$ and $a^2$ in formula (I-A) or $a^{11}$ and $a^{12}$ in formula (I-B);

(2) the oil-based ink described in the above (1), wherein said resin for dispersion stabilization (P) contains at least one polar group selected from the group consisting of —PO$_3$H$_2$, —SO$_3$H, —COOH, —P(=O) (OH)R$^1$, —OH, a formyl group, —CONR$^3$R$^4$, —SO$_2$NR$^3$R$^4$, a cyclic acid anhydride-containing group and an amino group at one end of at least one main chain of the polymer, in which R$^1$ represents a hydrocarbon group or —OR$^2$; R$^2$ represents a hydrocarbon group; and R$^3$ and R$^4$ are the same or different and each represents a hydrogen atom or a hydrocarbon group;

(3) a method for preparing a printing plate by an ink jet process comprising spraying the oil-based ink described in the above (1) or (2) on a water-resistant support having a lithographically printable hydrophilic surface dropwise from a nozzle to form an image;

(4) the method described in the above (3), wherein said image formation by an ink jet process is conducted by a method of discharging the oil-based ink using an electrostatic field;

(5) the method described in the above (3) or (4), wherein said lithographic printing plate precursor comprises a water-resistant support having provided thereon an image receiving layer having a lithographically printable hydrophilic surface, and the support has a specific electric resistance of $10^{10}$ Ωcm or less at least at an area directly under the image receiving layer;

(6) the method described in any one of the above (3) to (5), wherein said water-resistant support is a support having a specific electric resistance of $10^{10}$ Ωcm or less as a whole of the support; and (7) the method described in any one of the above (3) to (6), wherein said resin particles dispersed in the oil-based ink are electrically detectable particles positively or negatively charged.

Figure 1:
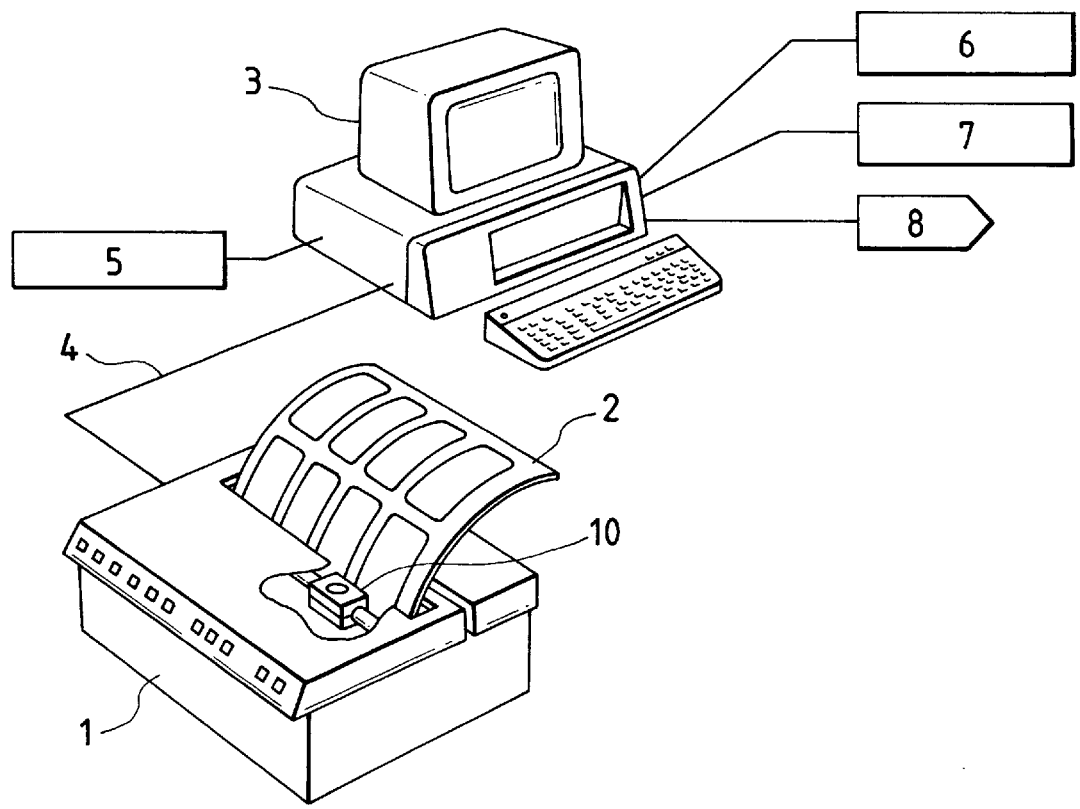
FIG. 1 is a schematic view showing one embodiment of a device system used in the present invention.

| | |
|---|---|
| 1 | Ink jet recording device |
| 2 | Master |
| 3 | Computer |
| 4 | Path |
| 5 | Video camera |
| 6 | Hard disk |
| 7 | Floppy disk |
| 8 | Mouse |
| 10 | Head |
| 10a | Discharge slit |
| 10b | Discharge electrode |
| 10c | Counter electrode |
| 11 | Oil-based ink |
| 101 | Upper unit |
| 102 | Lower unit |

DETAILED DESCRIPTION OF THE DRAWINGS

The present invention is characterized in that the above-mentioned oil-based ink is discharged on a printing precursor for lithographic printing by an ink jet process to form an image. The oil-based ink used is excellent in dispersion stability, redispersibility and storage stability, and it is possible to print clear images on a number of sheets by use of the resulting lithographic printing plate.

The oil-based ink for use in the present invention is described below.

The nonaqueous carrier liquids having an electric resistance of $10^9$ Ωcm or more and a dielectric constant of 3.5 or less used in the present invention preferably include straight chain or branched aliphatic hydrocarbons, alicyclic hydrocarbons, aromatic hydrocarbons and halogen-substituted products of these hydrocarbons. Specific examples thereof include octane, isooctane, decane, isodecane, decalin, nonane, dodecane, isododecane, cyclohexane, cyclooctane, cyclodecane, benzene, toluene, xylene, mesitylene Isoper-E, Isoper-G, Isoper-H, Isoper-L (Isoper: trade name of Exxon Co.), Shellsol 70, Shellsol 71 (Shellsol: trade name of Shell Oil Co.), Amsco OME and Amsco 460 (Amsco: trade name of Spirits Co.), and mixtures thereof. The upper limit value of the electric resistance of such nonaqueous carrier liquids is about $10^{16}$ Ωcm, and the lower limit value of the dielectric constant is about 1.80.

The nonaqueous dispersed resin particles (hereinafter also referred to as "latex particles"), which are the most important constituent in the present invention, are granulated in the presence of a resin (P) for dispersion stabilization which is soluble in an nonaqueous solvent by (i) polymerizing at least one monofunctional monomer (A) with at least one monomer (B) (referred to as "first embodiment of the present invention") or (ii) polymerizing at least one monofunctional monomer (A) with at least one macromonomer (MA) (referred to as "second embodiment of the present invention").

Here, as the nonaqueous solvents, ones miscible with the nonaqueous carrier liquids of the above-mentioned oil-based ink are basically usable.

That is, as the solvents used in producing the dispersed resin particles, any solvents may be used as long as they are miscible with the above-mentioned carrier liquids. Preferred examples thereof include straight chain or branched aliphatic hydrocarbons, alicyclic hydrocarbons, aromatic hydrocarbons and halogen-substituted products of these hydrocarbons. For example, hexane, octane, isooctane, decane, isodecane, decalin, nonane, dodecane, isododecane, Isoper-E, Isoper-G, Isoper-H, Isoper-L, Shellsol -70, Shellsol 71, Amsco OME and Amsco 460 solvents can be used alone or as a mixture of them.

Solvents which can be used by mixing together with these organic solvents include alcohols (for example, methyl alcohol, ethyl alcohol, propyl alcohol, butyl alcohol and fluorinated alcohols), ketones (for example, acetone, methyl ethyl ketone and cyclohexanone), carboxylic acid esters (for example, methyl acetate, ethyl acetate, propyl acetate, butyl acetate, methyl propionate and ethyl propionate), ethers (for example, diethyl ether, dipropyl ether, tetrahydrofuran and dioxane), and hydrocarbon halides (for example, methylene dichloride, chloroform, carbon tetrachloride, dichloroethane and methylchloroform).

These nonaqueous solvents used by mixing are desirably removed by distillation under heating or reduced pressure after polymerization granulation. However, even if they are taken in oil-based ink as latex particle dispersions, no problem is encountered as long as the requirements that the resistance of the ink is $10^9$ Ωcm or more and that the dielectric constant is 3.5 or less satisfied.

Usually, it is preferred that solvents similar to the carrier liquids are used in the stage of the production of resin dispersions. As described above, such solvents include straight chain or branched aliphatic hydrocarbons, alicyclic hydrocarbons, aromatic hydrocarbons and hydrocarbon halides.

The monofunctional monomers (A) for use in the present invention may be any, as long as they are monofunctional monomers soluble in nonaqueous solvents, but insolubilized by polymerization. Specific examples thereof include monomers represented by the following formula (V):

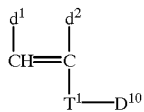

(V)

wherein $T^1$ represents —COO—, —OCO—, —CH$_2$OCO—, —CH$_2$COO—, —O—, —CONHCOO—, —CONHOCO—, —SO$_2$—, —CON (W$^1$)—, —SO$_2$N (W$^1$)— or a phenylene group (a phenylene group is hereinafter described as "—Ph—", including 1,2-, 1,3- and 1,4-phenylene groups), in which W$^1$ represents a hydrogen atom or an aliphatic group having 1 to 8 carbon atoms which may be substituted (for example, methyl, ethyl, propyl, butyl, 2-chloroethyl, 2-bromoethyl, 2-cyanoethyl, 2-hydroxyethyl, benzyl, chlorobenzyl, methylbenzyl, methoxybenzyl, phenethyl, 3-phenylpropyl, dimethylbenzyl, fluorobenzyl, 2-methoxyethyl and 3-methoxypropyl);

$D^{10}$ represents a hydrogen atom or an aliphatic group having 1 to 6 carbon atoms which may be substituted (for example, methyl, ethyl, propyl, butyl, 2-chloroethyl, 2,2-dichloroethyl, 2,2,2-trifluoroethyl, 2-bromoethyl, 2-glycidylethyl, 2-hydroxyethyl, 2-hydroxypropyl, 2,3-dihydroxypropyl, 2-hydroxy-3-chloropropyl, 2-cyanoethyl, 3-cyanopropyl, 2-nitroethyl, 2-methoxyethyl, 2-methanesulfonylethyl, 2-ethoxyethyl, N,N-dimethylaminoethyl, N,N-diethylaminoethyl, trimethoxysilylpropyl, 3-bromopropyl, 4-hydroxybutyl, 2-furfurylethyl, 2-thienylethyl, 2-pyridylethyl, 2-morpholinoethyl, 2-carboxyethyl, 3-carboxypropyl, 4-carboxybutyl, 2-phosphoethyl, 3-sulfopropyl, 4-sulfobutyl, 2-carboxyamidoethyl, 3-sulfoamidopropyl, 2-N-methylcarboxyamidoethyl, cyclopentyl, chlorocyclohexyl or dichlorohexyl); and $d^1$ and $d^2$ are the same or different and each preferably represents a hydrogen atom, a halogen atom (for example, chlorine or bromine), a cyano group, an alkyl group having 1 to 3 carbon atoms (for example, methyl, ethyl or propyl), —COO—$Z^1$ or —CH$_2$—COO—$Z^1$, in which $Z^1$ represents a hydrogen atom or a hydrocarbon group having 10 or less carbon atoms which may be substituted (for example, alkyl, alkenyl, aralkyl or aryl).

Specific examples of the monofunctional monomers (A) include vinyl esters or allyl esters of aliphatic carboxylic acids having 1 to 6 carbon atoms (for example, acetic acid, propionic acid, butyric acid, monochloroacetic acid and trifluoropropionic acid); alkyl esters or amides having 1 to 4 carbon atoms which may be substituted of unsaturated carboxylic acids such as acrylic acid, methacrylic acid, crotonic acid, itaconic acid and maleic acid (the alkyl groups include, for example, methyl, ethyl, propyl, butyl, 2-chloroethyl, 2-bromoethyl, 2-fluoroethyl, trifluoroethyl, 2-hydroxyethyl, 2-hydroxypropyl, 2-cyanoethyl, 2-nitroethyl, 2-methoxyethyl, 2-methanesulfonylethyl, 2-benzenesulfonylethyl, 2-(N,N-dimethylamino)ethyl, 2-(N,N-diethylamino)ethyl, 2-carboxyethyl, 2-phosphoethyl, 4-carboxybutyl, 3-sulfopropyl, 4-sulfobutyl, 3-chloropropyl, 2-hydroxy-3-chloropropyl, 2-furfurylethyl, 2-pyridinylethyl, 2-thienylethyl, trimethoxysilylpropyl and 2-carboxyamidoethyl); styrene derivatives (for example, styrene, vinyltoluene, α-methylstyrene, vinylnaphthalene, chlorostyrene, dichlorostyrene, bromostyrene, vinylbenzenecarboxylic acid, vinylbenzenesulfonic acid, chloromethylstyrene, hydroxymethylstyrene, methoxymethylstyrene, N,N-dimethylaminomethylstyrene, vinylbenzenecarboxyamide and vinylbenzenesulfoamide); unsaturated carboxylic acids such as acrylic acid, methacrylic acid, crotonic acid, maleic acid and itaconic acid; cyclic acid anhydrides of maleic acid and itaconic acid; acrylonitrile; methacrylonitrile; and heterocyclic compounds having polymerizable double bond groups (specifically, for example, compounds described in "Polymer Data Handbook, —Fundamental Volume—", edited by Kobunshi Gakkai, pages 175 to 184, Baifukan (1986), for example, N-vinylpyridine, N-vinylimidazole, N-vinylpyrrolidone, vinylthiophene, vinyltetrahydrofuran, vinyloxazoline, vinylthiazole and N-vinylmorpholine).

Two or more kinds of monomers (A) may be used in combination.

Then, the monomers (B) for use in the present invention, having specific substituents and represented by formula (I-A) are further described.

First, the case where $E^1$ represents an aliphatic group having 8 or more carbon atoms is described in detail.

$E^1$ preferably represents an alkyl group having a total carbon number of 10 or more which may be substituted, or an alkenyl group having a total carbon number of 10 or more. Examples thereof include a decyl group, a dodecyl group, a tridecyl group, a tetradecyl group, a pentadecyl group, a hexadecyl group, a heptadecyl group, an octadecyl group, a docosanyl group, an eicosanyl group, a decenyl group, a dodecenyl group, a tridecenyl group, a tetradecenyl group, a hexadecenyl group, an octadecenyl group, a docosenyl group, a linoleyl group and an oleyl group. Substituents thereof include a halogen atom (e.g., fluorine, chlorine, bromine), a hydroxyl group, a cyano group, and an alkoxy group (e.g., methoxy, ethoxy, propoxy, butoxy).

$U^1$ preferably represents —COO—, —CONH—, —CON (R$^{11}$)—, (in which R$^{11}$ preferably represents an aliphatic group having 1 to 32 carbon atoms (examples of the aliphatic groups include alkyl, alkenyl and aralkyl)), —OCO—, —CH$_2$OCO— or —O—. More preferably, U$^1$ is —COO—, —CONH— or —CON(R$^{11}$)—.

a$^1$ and a$^2$ are the same or different and each preferably represents a hydrogen atom, a halogen atom (e.g., fluorine, chlorine, bromine), a cyano group, an alkyl group having 1 to 3 carbon atoms, —COO—R$^{13}$ or —CH$_2$COO—R$^{13}$ (in which R$^{13}$ preferably represents an aliphatic group having 1 to 32 carbon atoms, such as methyl, ethyl, propyl, butyl, hexyl, octyl, decyl, dodecyl, tridecyl, tetradecyl, hexadecyl, octadecyl, docosanyl, pentenyl, hexenyl, heptenyl, octenyl, decenyl, dodecenyl, tetradecenyl, hexadecenyl and octadecenyl). These aliphatic group may have a substituent described in the above E$^1$. More preferably, a$^1$ and a$^2$ are each a hydrogen atom, an alkyl group having 1 to 3 carbon atoms (e.g., methyl, ethyl, propyl), —COO—R$^{13}$ or —CH$_2$COO—R$^{13}$ (in which R$^{13}$ is more preferably an alkyl or alkenyl group having 1 to 12 carbon atoms, such as methyl, ethyl, propyl, butyl, hexyl, octyl, decyl, dodecyl, tridecyl, tetradecyl, hexadecyl, octadecyl, docosanyl, pentenyl, hexenyl, heptenyl, octenyl, decenyl) which may be substituted.

When E$^1$ represents an aliphatic group having 8 or more carbon atoms in the monomers (B) represented by formula (I-A) as described above, specific examples thereof include esters of unsaturated carboxylic acids such as acrylic acid, α-fluoroacrylic acid, α-chloroacrylic acid, α-cyanoacrylic acid, methacrylic acid, crotonic acid, maleic acid and itaconic acid having aliphatic groups each having a total carbon number of 10 to 32 (the aliphatic groups may contain halogen atoms and substituents such as hydroxyl, amino and alkoxy groups, or heteroatoms such as oxygen, sulfur and nitrogen atoms may intervene carbon-carbon bonds of main chains) (examples of the aliphatic groups include decyl, dodecyl, tridecyl, tetradecyl, hexadecyl, octadecyl, docosadecyl, dodecenyl, hexadecenyl, oleyl, linoleyl and docosenyl); amides of the above-mentioned unsaturated carboxylic acids (the aliphatic groups have the same meaning as given for the esters); vinyl esters or allyl esters of higher fatty acids (examples of the higher fatty acids include lauric acid, myristic acid, stearic acid, oleic acid, linoleic acid and behenic acid); and vinyl ethers substituted by aliphatic groups each having a total carbon number of 10 to 32 (the aliphatic groups have the same meaning as given for the aliphatic groups of the above-mentioned unsaturated carboxylic acids).

The case where E$^1$ represents a substituent having a total number of atoms of 8 or more (excluding a hydrogen atom directly attached to a carbon or nitrogen atom) represented by formula (IV-A) in the monomer represented by formula (I-A) is described in detail.

A$^1$ and A$^2$ each represents at least one group selected from the group consisting of a group represented by formula (IV-Aa) and a hydrocarbon group having 1 to 18 carbon atoms (in the case of two or more, each represents a bond of the group of formula (IV-Aa) and/or the hydrocarbon group). More specifically, they are composed of any combinations of atomic groups such as —C(R$^{24}$) (R$^{25}$)— (in which R$^{24}$ and R$^{25}$ each represents a hydrogen atom, an alkyl group or a halogen atom), —(CH=CH)—, a cyclohexylene group (the cyclohexylene group is hereinafter often represented by "—C$_6$H$_{10}$—", including 1,2-, 1,3- and 1,4-cyclohexylene groups) and the group represented by formula (IV-Aa).

When E$^1$ represents the substituent having a total number of atoms of 8 or more represented by formula (IV-A), it is preferred that a "binding main chain" composed of U$^1$ to R$^{21}$ (namely, U$^1$, A$^1$, B$^1$, A$^2$, B$^2$ and R$^{21}$) in a binding group (—U$^1$—(A$^1$—B$^1$)$_m$—(A$^2$—B$^2$)$_n$—R$^{21}$) in formula (I-A) has a total number of atoms constituting the binding main chain of 8 or more.

Here, the number of atoms constituting the "binding main chain" means that, for example, when U$^1$ represents —COO— or —CONH—, the oxo group (=O group) and the hydrogen atom are not contained in the number of atoms, and the carbon atom, the ether type oxygen atom and the nitrogen atom constituting the binding main chain are contained in the number of atoms (which is different from the total number of atoms specified in E$^1$). Accordingly, with respect to —COO— and —CONH—, the number of atoms is counted as 2. At the same time, when R$^{21}$ represents —C$_9$H$_{19}$, the hydrogen atoms are not contained in the number of atoms, and the carbon atoms are contained therein. In this case, therefore, the number of atoms is counted as 9.

When U$^1$ represents —CON(E$^2$)—, and E$^2$ represents the substituent represented by formula (IV-A), namely (—U$^1$—(A$^1$—B$^1$)$_m$—(A$^2$—B$^2$)$_n$—R$^{21}$), a binding main chain composed of E$^2$ is also included in the above-mentioned "binding main chain". Furthermore, when A$^1$ and A$^2$ each has the group represented by formula (IV-Aa), a (—B$^3$—(A$^4$—B$_4$)$_p$—R$^{23}$) group is also included in the above-mentioned "binding main chain".

In the monomer (B) represented by formula (I-A) as described above, specific examples in the case where E$^1$ represents the substituent shown by formula (IV-A) include the following compounds.

In the following formulas (1) to (19), each symbol shows the following contents: r$_1$: —H, —CH$_3$, —Cl or —CN; r$_2$: —H or —CH$_3$; l: an integer of 2 to 10; p: an integer of 2 to 6; q: an integer of 2 to 4; m: an integer of 1 to 12; n: an integer of 4 to 18.

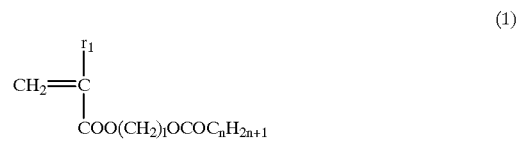

(1)

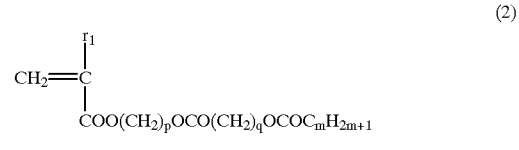

(2)

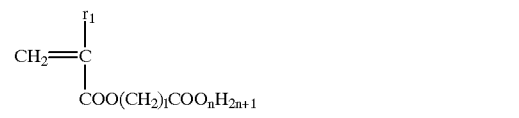

(3)

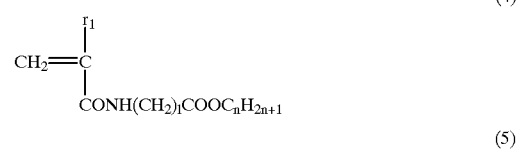

(4)

(5)

(6)
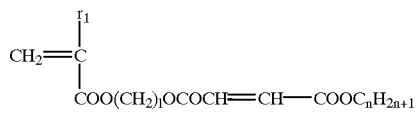

(7)
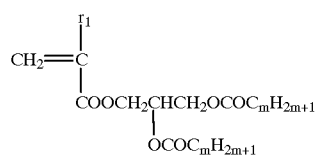

(8)
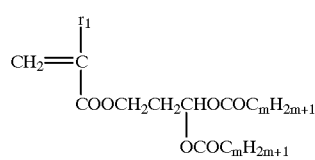

(9)
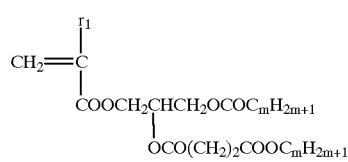

(10)
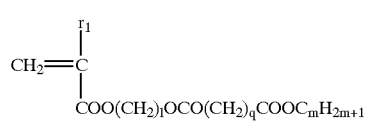

(11)
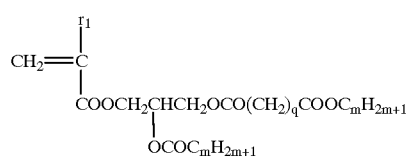

(12)
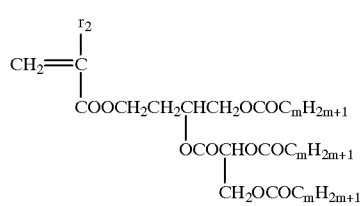

(13)
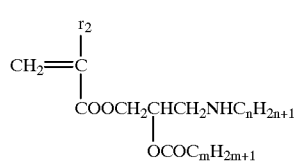

(14)

$$CH_2=\overset{r_2}{\underset{|}{C}}$$
$$\underset{|}{COOCH_2CHCH_2NHC_nH_{2n+1}}$$
$$OCOC_mH_{2m+1}$$

(15)
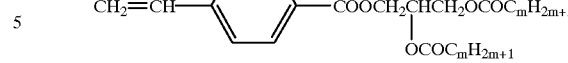

(16)
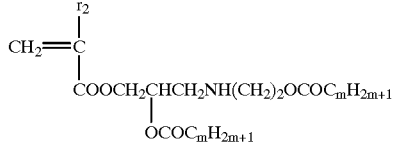

(17)

(18)
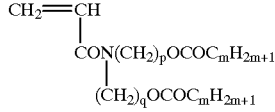

(19)
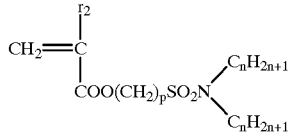

The dispersed resin according to the first embodiment of the present invention comprises at least one monomer (A) and at least one monomer (B), and it is important that the resin synthesized from these monomers is insoluble in an nonaqueous solvent, thereby being able to obtain the desired dispersed resin.

More specifically, the monomer (B) represented by formula (I-A) is used preferably in an amount of 0.1% to 15% by weight, more preferably 0.2% to 10% by weight, based on the monomer (A) to be insolubilized.

Then, the monofunctional macromonomers (MA) for use in the present invention are further described.

The monofunctional macromonomer (MA) is a macromonomer having a weight average molecular weight of $2 \times 10^4$ or less in which a polymerizable double bond group represented by formula (II-B) is combined with only one end of a main chain of a polymer comprising repeating units represented by formula (I-B).

In formulas (I-B) and (II-B), hydrocarbon groups contained in $a^{11}$, $a^{12}$, $V^0$, $D^0$, $b^{11}$ and $b^{12}$ each has carbon atoms shown (as an unsubstituted hydrocarbon group), but they may be substituted with a halogen atom, an acyl group, an amino group, a cyano group, an alkyl group having 1 to 5 carbon atoms, an alkoxy group, an aryl group which may be substituted with an alkyl or haloalkyl group, or an amido group.

In formula (I-B), $D^{11}$ in the substituent group represented by $V^0$ represents a hydrocarbon atom, as well as a hydrogen atom. Preferred examples of the hydrocarbon groups include alkyl groups having 1 to 22 carbon atoms which maybe substituted (for example, methyl, ethyl, propyl, butyl, heptyl, hexyl, octyl, nonyl, decyl, tridecyl, tetradecyl, hexadecyl, octadecyl, eicosanyl, docosanyl, 2-chloroethyl, 2-bromoethyl, 2-cyanoethyl, 2-methoxycarbonylethyl, 2-methoxyethyl and 3-bromopropyl), alkenyl groups having 4 to 18 carbon atoms which may be substituted (for example, 2-methyl-1-propenyl, 2-butenyl, 2-pentenyl, 3-methyl-2-pentenyl, 1-pentenyl, 1-hexenyl, 2-hexenyl, 4-methyl-2-hexenyl, decenyl, dodecenyl, tridecenyl, hexadecenyl, octadecenyl and linoleyl), aralkyl groups having 7 to 12 carbon atoms which may be substituted (for example, benzyl, phenetyl, 3-phenylpropyl, naphthylmethyl, 2-naphthylethyl, chlorobenzyl, bromobenzyl, methylbenzyl, ethylbenzyl, methoxybenzyl, dimethylbenzyl and dimethoxybenzyl), alicyclic groups having 5 to 8 carbon atoms which may be substituted (for example, cyclohexyl, 2-cyclohexylethyl and 2-cyclopentylethyl), and aromatic groups having 6 to 12 carbon atoms which may be substituted (for example, phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propioamidophenyl and dodecyloylamidophenyl).

When $V^0$ represents —Ph— (a phenylene group), a benzene ring may have a substituent group. The substituent groups include halogen atoms (for example, chlorine and bromine) and alkyl groups (for example, methyl, ethyl, propyl, butyl, chloromethyl and methoxymethyl).

$a^{11}$ and $a^{12}$ are the same or different and each preferably represents a hydrogen atom, a halogen atom (for example, chlorine or bromine), a cyano group, an alkyl group having 1 to 3 carbon atoms (for example, methyl, ethyl or propyl), —COO—$D^{13}$ or —CH$_2$COO—$D^{13}$ (wherein $D^{13}$ represents a hydrogen atom or an alkyl, alkenyl, aralkyl, alicyclic or aryl group having 1 to 18 carbon atoms, which may be substituted, and specific examples thereof are the same as those described for $D^{11}$ above).

When $D^0$ represents a hydrocarbon group having 8 to 22 carbon atoms, specific examples thereof are the same as those described for $D^{11}$ mentioned above.

The case where $D^0$ represents a substituent having a total number of atoms of 8 or more (excluding a hydrogen atom directly attached to a carbon or nitrogen atom) represented by formula (III-B) is described in detail.

$A^{11}$ and $A^{12}$ each represents at least one group selected from a group represented by formula (IV-Ba) and a hydrocarbon group having 1 to 18 carbon atoms (examples of the hydrocarbon group include an alkyl group, an alkenyl group, an aralkyl group and an alicyclic group, and specific examples thereof include those described as $D^{11}$) (in the case of two or more, each represents a bond of the group of formula (IV-Ba) and/or the hydrocarbon group).

More specifically, examples of $A^{11}$ and $A^{12}$ include any combinations of atomic groups such as —C($D^{31}$) ($D^{32}$)— (in which $D^{31}$ and $D^{32}$ each represents a hydrogen atom, an alkyl group or a halogen atom), —(CH═CH)—, a phenylene group (—Ph—), a cyclohexylene group and the group represented by formula (IV-Ba).

When $D^0$ represents the substituent having a total number of atoms of 8 or more represented by formula (IV-B), it is preferred that a "binding main chain" composed of $V^0$ to $D^{21}$ (namely, $V^0$, $A^{11}$, $B^{11}$, $A^{12}$, $B^{12}$ and $D^{21}$) in a binding group (—$V^0$—($A^{11}$—$B^{11}$)$_{m0}$—($A^{12}$—$B^{12}$)$_{n0}$—$D^{21}$) in formula (I-B) has a total number of atoms constituting the binding main chain of 8 or more. The number of atoms constituting the binding main chain is counted in the same manner as described above in formula (I-A).

In the repeating unit represented by formula (I-B) as described above, specific examples in the case where $D^0$ represents the substituent shown by formula (IV-B) include repeating units represented by the above-described formulas (1) to (19).

The macromonomer (MA) used in the present invention has a chemical structure in which a polymerizable double bond group represented by formula (II-B) is combined with only one end of a main chain of a polymer comprising repeating units corresponding to a monomer represented by formula (I-B), directly or through any binding group.

In formula (II-B), $V^1$ represents —COO—, —CONHCOO—, —CONHCONH—, —CONH— or a phenylene group.

Here, specific examples of the phenylene groups are the same as those of the phenylene groups for $V^0$ in formula (I-B).

$b^{11}$ and $b^{12}$ are the same or different and each has the same meaning as $a^{11}$ and $a^{12}$ in formula (I-B), and examples thereof are the same as those of $a^{11}$ and $a^{12}$.

It is more preferred that either of $b^{11}$ and $b^{12}$ in formula (II-B) is a hydrogen atom.

A group connecting a component of formula (I-B) to a component of formula (II-B) is constituted by any combination of atomic groups of a carbon-carbon bond (single bond or double bond), a carbon-heteroatom bond (examples of the heteroatoms include an oxygen atom, a sulfur atom, a nitrogen atom and silicon atom) and a heteroatom-heteroatom bond.

Of the macromonomers (MA) of the present invention, preferred are ones represented by the following formula (VI-B):

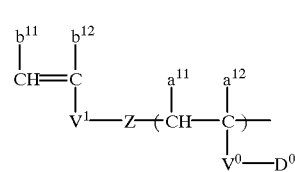

(VI-B)

wherein symbols other than Z have the same meanings as given for those in formulas (I-B) and (II-B).

Z represents a single bond, or an independent binding group selected from atomic groups such as —C($D^{41}$) ($D^{42}$)— (in which $D^{41}$ and $D^{42}$ each independently represents a hydrogen atom, a halogen atom (for example, fluorine, chlorine or bromine), a cyano group, a hydroxyl group, an alkyl group (for example, methyl, ethyl or propyl)), —(CH═CH)—, —C$_6$H$_{10}$— (a cyclohexylene group), —Ph— (a phenylene group), —O—, —S—, —CO—, —N($D^{43}$)—, —COO—, —SO—, —CON($D^{43}$)—, —SON($D^{43}$)—, —NHCOO—, —NHCONH—, —Si($D^{43}$) ($D^{44}$)— (in which $D^{43}$ and $D^{44}$ each independently represents a hydrogen atom or a hydrocarbon group having the same meaning as given for D described above) and an independent binding group shown in groups shown below, or a binding group constituted by any combination thereof.

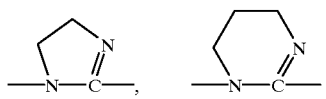

In formula (VI-B), particularly preferred examples of $a^{11}$, $a^{12}$, $b^{11}$, $b^{12}$, $V^0$ and $V^1$ are each shown below.

$V^0$ includes —COO—, —OCO—, —O—, —CH$_2$COO— and —CH$_2$OCO—, $V^1$ includes all the groups described above, and $a^{11}$, $a^{12}$, $b^{11}$ and $b^{12}$ include a hydrogen atom and a methyl group.

Specific examples of moieties represented by the following formula (II'-B) in formula (VI-B) are shown below, but it is to be understood that the present invention is not limited thereto:

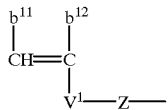
(II'-B)

In the following, b represents —H or —CH$_3$; $m^1$ represents an integer of 1 to 12; and $n^1$ represents an integer of 2 to 12.

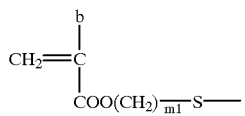
(II'-1)

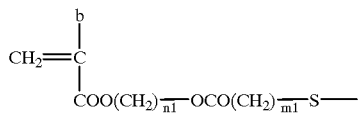
(II'-2)

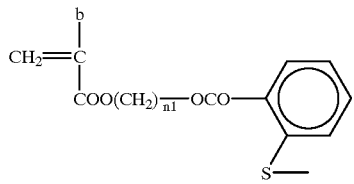
(II'-3)

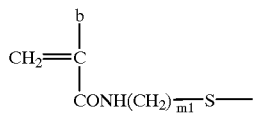
(II'-4)

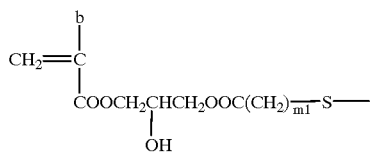
(II'-5)

-continued

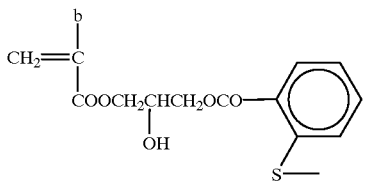
(II'-6)

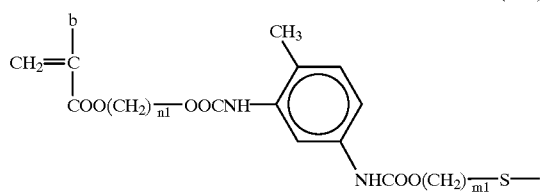
(II'-7)

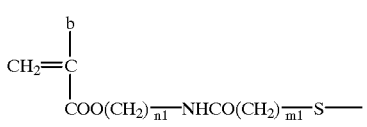
(II'-8)

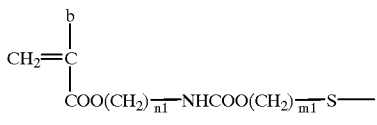
(II'-9)

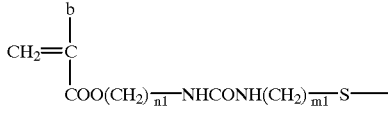
(II'-10)

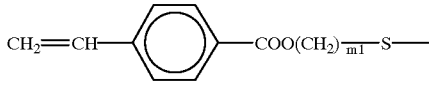
(II'-11)

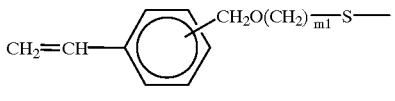
(II'-12)

(II'-13)

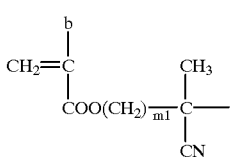
(II'-14)

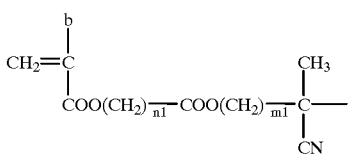
(II'-15)

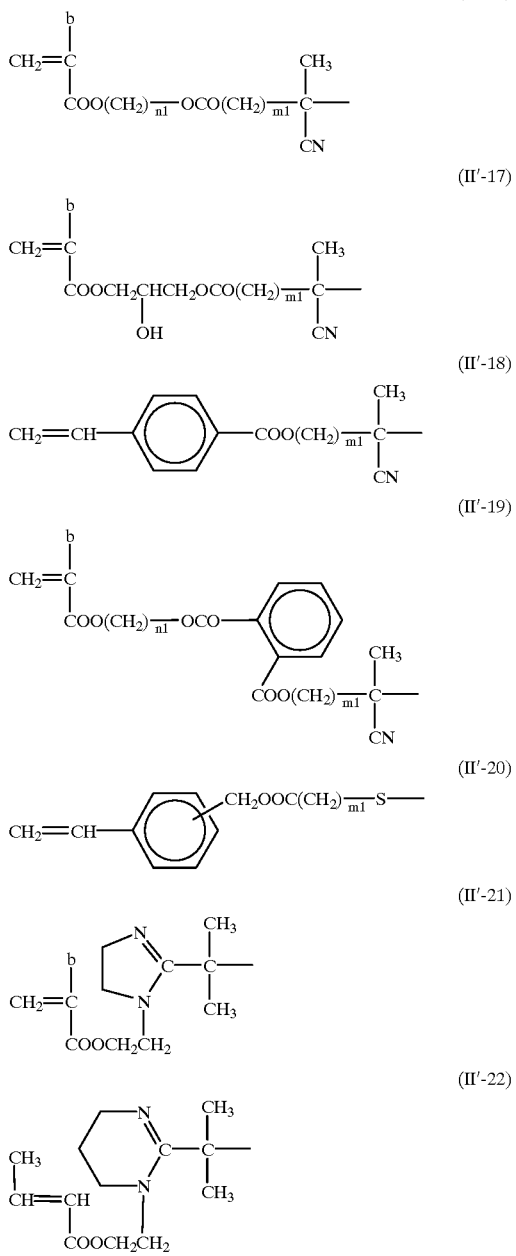

Furthermore, in polymerization components of the macromonomers (MA) used in the present invention, other repeating units may be contained as copolymerization components together with the repeating units corresponding to the monomers represented by formula (I-B).

The other copolymerization components may be any compounds, as long as they are monomers copolymerizable with the monomers corresponding to the repeating units of formula (I-B). Examples thereof include unsaturated carboxylic acids such as acrylic acid, methacrylic acid, itaconic acid, crotonic acid, maleic acid, vinylacetic acid and 4-pentenoic acid, esters and amides of these unsaturated carboxylic acids, vinyl esters and allyl esters of fatty acids having 1 to 22 carbon atoms, vinyl ethers, styrene and styrene derivatives and heterocyclic compounds containing unsaturated binding groups.

Specific examples thereof include but are not limited to the compounds shown as examples in the above-mentioned monomers (A).

In the total amount of the repeating units of the macromonomer (MA), a component of the repeating units corresponding to the monomer represented by formula (I-B) is contained preferably in an amount of 60% by weight or more of the total, and more preferably in an amount of 80% to 100% by weight.

The macromonomer (MA) of the present invention has a weight average molecular weight of $1 \times 10^3$ to $2 \times 10^4$, preferably $3 \times 10^3$ to $1.5 \times 10^4$.

Within each specified range described above, the dispersed resin particles show the effects in dispersion stability, redispersion stability and storage stability.

The macromonomers (MA) of the present invention can be produced by known synthesis methods. Examples thereof include (1) a method by ionic polymerization in which various reagents are allowed to react on terminals of living polymers to form macromonomers; (2) a method by radical polymerization in which various reagents are allowed to react with terminal reactive group-binding oligomers obtained by radical polymerization using polymerization initiators and/or chain transfer agents containing reactive groups such as carboxyl, hydroxyl and amino groups in their molecules, thereby forming macromonomers; and (3) a method by polyaddition condensation in which polymerizable double bond groups are introduced into oligomers obtained by polyaddition or polycondensation reaction, in the same manner as in the above-mentioned radical polymerization method.

Specifically, they can be synthesized according to methods described in reviews, and literatures and patents cited therein, such as P. Dreyfuss & R. P. Quirk, Encycl. Polym. Sci. Eng., 7:551 (1987), P. F. Rempp & E. Franta, Adv. Polym. Sci., 58:1 (1984), V. Percec, Appl. Polym. Sci., 285:95 (1984), R. Asami & M. Takari, Makromol, Chem. Suppl., 12:163 (1985), P. Rempp et al., Makvamol. Chem. Suppl., 8:3 (1984), Yusuke Kawakami, Kagaku Kogyo, 38:56 (1987), Yuya Yamashita, Kobunshi, 31:988 (1982), Shiro Kobayashi, Kobunshi, 30:625 (1981), Toshinobu Higashimura, Nippon Setchaku Kyokaishi, 18:536 (1982), Koichi Ito, Kobunshi Kako, 35:262 (1986) and Kishiro Azuma & Takashi Tsuda, Kino Zairyo, 10:5 (1987).

Examples of the above-mentioned polymerization initiators containing reactive groups in their molecules include azobis compounds, such as 4,4'-azobis(4-cyanovaleric acid), 4,4'-azobis(4-cyanovaleric acid chloride), 2,2'-azobis(2-cyanopropanol), 2,2'-azobis(2-cyanopentanol), 2,2'-azobis[2-methyl-N-(2-hydroxyethyl)propioamide], 2,2'-azobis{2-methyl-N-[1,1-bis(hydroxymethyl)ethyl]propioamide}, 2,2'-azobis{2-methyl-N-[1,1-bis(hydroxymethyl)-2-hydroxyethyl]propioamide}, 2,2'-azobis(2-amidinopropane), 2,2'-azobis[2-methyl-N-(2-hydroxyethyl) propioamide], 2,2'-azobis[2-(5-methyl-2-imidazoline-2-yl)propane], 2,2'-azobis[2-(4,5,6,7-tetrahydro-1H-1,3-diazepine-2-yl)propane], 2,2'-azobis[2-(3,4,5,6,-tetrahydropyrimidine-2-yl)propane], 2,2'-azobis[2-(5-hydroxy-3,4,5,6,-tetrahydropyrimidine-2-yl)propane], 2,2'-azobis{2-[1-(2-hydroxyethyl)-2-imidazoline-2-yl]propane}, 2,2'-azobis[N-(2-hydroxyethyl)-2-methylpropionamide] and 2,2'-azobis [N-(4-aminophenyl)-2-methylpropionamidine].

Furthermore, examples of the chain transfer agents containing specific reactive groups in their molecules include mercapto compounds containing said reactive groups or substituent groups derivable to the reactive groups (for example, thioglycolic acid, thiomalic acid, thiosalicylic acid, 2-mercaptopropionic acid, 3-mercaptopropionic acid, 3-mercaptobutyric acid, N-(2-mercaptopropionyl) glycine, 2-mercaptonicotinic acid, 3-[N-(2-mercaptoethyl) amino] propionic acid, N-(3-mercaptopropionyl)alanine, 2-mercaptoethanesulfonic acid, 3-mercaptopropanesulfonic acid, 4-mercaptobutanesulfonic acid, 2-mercaptoethanol, 3-mercapto-1,2-propanediol, 1-mercapto-2-propanol, 3-mercapto-2-butanol, mercaptophenol, 2-mercaptoethylamine, 2-mercaptoimidazole and 2-mercapto-3-pyridinol) and iodinated alkyl compounds containing said reactive groups or substituent groups derivable to said reactive groups (for example, iodoacetic acid, iodopropionic acid, 2-iodoethanol, 2-iodoethanesulfonic acid and 3-iodopropanesulfonic acid). Preferred examples thereof include mercapto compounds.

The amounts of these chain transfer agents and the polymerization initiators used are each preferably 0.5 to 20 parts by weight, and more preferably 1 to 10 parts by weight, based on 100 parts by weight of the total monomers.

The dispersed resin according to the second embodiment of the present invention comprises at least one monomer (A) and at least one monofunctional macromonomer (MA) It is important that the resin synthesized from these monomer is insoluble in a nonaqueous solvent, whereby the desired dispersed resin can be obtained.

More specifically, the monofunctional macromonomer (MA) is used preferably in an amount of 0.1% to 20% by weight, and more preferably 0.3% to 15% by weight, based on the monomer (A) to be insolubilized.

The weight average molecular weight of the dispersed resin of the present invention is preferably $5\times10^3$ to $1\times10^6$, and more preferably $8\times10^3$ to $5\times10^5$. As to thermal properties, the dispersed resin of the present invention has preferably a glass transition point ranging from 15° C. to 80° C. or a softening point of 38° C. to 120° C., and particularly preferably a glass transition point ranging from 20° C. to 60° C. or a softening point of 40° C. to 90° C.

Within the ranges as described above, the dispersed resin particles of the oil-based ink of the present invention are excellent in dispersion stability, redispersion stability and storage stability, the rapid fixing property after image formation is good, images are retained also in printing, and the high press life is exhibited.

The resins for dispersion stability (P) used in the present invention are described, which are used for turning polymers produced by polymerization of the monomers in aqueous solvents and insoluble in the nonaqueous solvents into stable resin dispersions.

The resin for dispersion stabilization (P) used in the present invention for turning a polymer produced by polymerization of the monomer in a nonaqueous solvent and insoluble in the nonaqueous solvent into a stable resin dispersion is a polymer containing at least one kind of repeating unit represented by formula (III), and a resin soluble in said nonaqueous solvent, in which a main chain of the polymer are partly crosslinked.

In the repeating unit represented by formula (III), the aliphatic and hydrocarbon groups may be substituted.

In formula (III), $X^1$ preferably represents —COO—, —OCO—, —CH$_2$OCO—, —CH$_2$COO— or —O—, more preferably —COO—, —CH$_2$COO— or —O—.

$Y^1$ preferably represents an alkyl, alkenyl or aralkyl group having 10 to 22 carbon atoms and may be substituted. Examples of the substituent include a halogen atom (e.g., fluorine, chlorine, bromine), —O—$Z^2$, —COO—$Z^2$ and —OCO—$Z^2$, in which $Z^2$ represents an alkyl group having 6 to 22 carbon atoms, such as hexyl, octyl, decyl, dodecyl, hexadecyl and octadecyl). More preferably, $Y^1$ represents an alkyl or alkenyl group having 8 to 22 carbon atoms (e.g., octyl, decyl, dodecyl, tridecyl, tetradecyl, hexadecyl, octadecyl, docosanyl, pentenyl, hexenyl, heptenyl, octenyl, decenyl, dodecenyl, tetradecenyl, hexadecenyl, octadecenyl).

$b^1$ and $b^2$ are the same or different and have the same meaning as $a^1$ and $a^2$ in formula (I-A) or $a^{11}$ and $a^{12}$ in formula (I-B). Preferably, $b^1$ and $b^2$ represents a hydrogen atom, a halogen atom, a cyano group, an alkyl group having 1 to 8 carbon atoms, —COO—$Z^1$ or —COO—$Z^1$ through a hydrocarbon group having 1 to 8 carbon atoms (wherein $Z^1$ represents an aliphatic group having 1 to 22 carbon).

More specifically, $b^1$ and $b^2$ each represents a hydrogen atom, a halogen atom (e.g., fluorine, chlorine, bromine), an alkyl group having 1 to 3 carbon atoms, —COO—$Z^3$ or —CH$_2$COO—$Z^3$ (wherein $Z^3$ represents an aliphatic group having 1 to 22 carbon atoms, such as methyl, ethyl, propyl, butyl, hexyl, octyl, decyl, dodecyl, tridecyl, tetradecyl, hexadecyl, octadecyl, docosanyl, pentenyl, hexenyl, heptenyl, octenyl, decenyl, dodecenyl, tetradecenyl, hexadecenyl and octadecenyl, which each may have a substituent group similar to one represented by $Y^1$ described above).

More preferably, $b^1$ and $b^2$ each represents a hydrogen atom, an alkyl group having 1 to 3 carbon atoms (e.g., methyl, ethyl, propyl), —COO—$Z^4$ or —CH$_2$COO—$Z^4$ (wherein $Z^4$ represents an alkyl or alkenyl group having 1 to 22 carbon atoms, such as methyl, ethyl, propyl, butyl, hexyl, octyl, decyl, dodecyl, pentenyl, hexenyl, heptenyl, octenyl, and decenyl, which each may have a substituent group similar to one represented by $Y^1$ described above).

The resins for dispersion stabilization (P) used in the present invention are polymers which contain copolymer components obtained by copolymerizing the monomers corresponding to the repeating units represented by the above-mentioned formula (III) with other monomers copolymerizable with said monomers, and in which the main chains of the polymers are partly crosslinked.

The other copolymerizable monomers may be any, as long as they contain polymerizable double bond groups. Examples thereof include unsaturated carboxylic acids such as acrylic acid, methacrylic acid, crotonic acid and itaconic acid, ester or amide derivatives of unsaturated carboxylic acids having 6 or less carbon atoms, vinyl esters or allyl esters of carboxylic acids, styrene derivatives, methacrylonitrile; acrylonitrile; and heterocyclic compounds containing polymerizable double bond groups. More specifically, they include compounds having the same contents as the above-mentioned monomers (A) to be insolubilized.

In the polymer components of the resin for dispersion stabilization (P), the component of the repeating units represented by formula (III) amounts at least 60% or more by weight, preferably 70% or more by weight, and more preferably 80% or more by weight, based on the components of the polymer.

As methods for introducing crosslinked structure into the polymers, usually known methods can be utilized, which are (1) methods of allowing multifunctional monomers to coexist, and conducting polymerization in the polymerization reaction of the monomers, and (2) methods of allowing functional groups enhancing the crosslinking reaction to be contained in the polymers, and conducting crosslinking by the polymer reaction.

For the resins for dispersion stabilization (P) used in the present invention, the crosslinking reaction by polymerization is effective from that the methods for producing them are simple and convenient (for example, they have few problems that the long reaction time is required, that the reaction is not quantitative, and that the resins are contaminated with impurities, due to the use of reaction accelerators and the like).

The term "crosslinking reaction by polymerization" means that in the polymerization reaction producing the resin for dispersion stabilization (P), preferably, the monomer having tow or more functional groups is polymerized with the monomer corresponding to the repeating unit represented by the above-mentioned formula (III), and a method of crosslinking between polymer chains.

Specific examples of the polymerizable functional groups include $CH_2=CH-$, $CH_2=CH-CH_2-$, $CH_2=CH-CO-O-$, $CH_2=C(CH_3)-CO-O-$, $CH_3-CH=CH-CO-O-$, $CH_2=CH-CONH-$, $CH_2=C(CH_3)-CONH-$, $CH_2=C(CH_3)-CONHCOO-$, $CH_2=C(CH_3)-CONHCONH-$, $CH_3-CH=CH-CONH-$, $CH_2=CH-O-CO-$, $CH_2=C(CH_3)-O-CO-$, $CH_2=CH-CH_2-O-CO-$, $CH_2=CH-NHCO-$, $CH_2=CH-CH_2-NHCO-$, $CH_2=CH-SO_2-$, $CH_2=CH-CO-$, $CH_2=CH-O-$ and $CH_2=CH-S-$. The monomer having two or more of the above-mentioned polymerizable functional groups may be a monomer having two or more of the same or different polymerizable functional groups described above.

As specific examples of the monomers each having two or more of the polymerizable functional groups, the monomers having the same polymerizable functional groups include, for example, styrene derivatives such as divinylbenzene and trivinylbenzene; polyhydric alcohols (for example, ethylene glycol, diethylene glycol, triethylene glycol, polyethylene glycol #200, #400 and #600, 1,3-butylene glycol, neopentyl glycol, dipropyl glycol, polypropylene glycol, trimethylolpropane, trimethylolethane, pentaerythritol), methacrylic, acrylic orcrotonicesters, vinyl ethers orally ethers of polyhydroxyphenols (for example, hydroquinone, resorcin, catechol, derivatives thereof); vinyl esters, allyl esters, vinyl amides or allyl amides of dibasic acids (for example, malonic acid, succinic acid, glutaric acid, adipic acid, pimelic acid, maleic acid, phthalic acid, itaconic acid); and condensation products of polyamines (for example, ethylenediamine, 1,3-propylenediamine, 1,4-butylenediamine) and carboxylic acids having vinyl groups (for example, methacrylic acid, acrylic acid, crotonic acid, allylacetic acid).

Furthermore, examples of the monomers each having different polymerizable functional groups include vinyl group-containing ester derivatives or amide derivatives (for example, vinyl methacrylate, vinyl acrylate, vinyl itaconate, allyl methacrylate, allyl acrylate, allyl itaconate, vinyl methacryloylacetate, vinyl methacryloylpropionate, allyl methacryloylpropionate, vinyloxycarbonylmethyl methacrylate, vinyloxycarbonylmethyloxycarbonylethylene acrylate, N-acrylamide, N-allylmethacrylamide, N-allylitaconic acid amide, methacryloylpropionic acid allylamide) of vinyl group-containing carboxylic acids [for example, methacrylic acid, acrylic acid, methacryloylacetic acid, acryloylacetic acid, methacryloylpropionic acid, acryloylpropionic acid, itaconiloylacetic acid, itaconiloylprbpionic acid, reaction products of carboxylic anhydrides and alcohols or amines (e.g., allyloxycarbonylpropionic acid, allyloxycarbonyl-acetic acid, 2-allyloxycarbonylbenzoic acid, allylaminocarbonylpropionic acid)]; or condensation products of aminoalcohols (for example, aminoethanol, 1-aminopropanol, 1-aminobutanol, 1-aminohexanol, 2-aminobutanol) and vinyl group-containing carboxylic acids.

The monomer having two or more polymerizable functional groups used in the present invention is polymerized in an amount of 10% or less by weight, and preferably in an amount of 8% or less by weight, based on the total monomers, to form the resin soluble in the nonaqueous solvent used in the present invention.

Preferably, the resins for dispersion stabilization (P) used in the present invention include a resin in which a specific polar group is combined with at least one end of a main chain of a polymer (hereinafter referred to as a resin for dispersion stabilization (PA) or a resin (PA)).

The specific polar groups include at least one polar group selected from $-PO_3H_2$, $-SO_3H$, $-COOH$, $-P(=O)(OH)R^{101}$ (wherein $R^{101}$ represents a hydrocarbon group or $-OR^{102}$ ($R^{102}$ represents a hydrocarbon group)), $-OH$, a formyl group, $-CONR^{103}R^{104}-$, $-SO_2NR^{103}R^{104}-$ (wherein $R^{103}$ and $R^{104}$ each independently represents a hydrogen atom or a hydrocarbon group), a cyclic acid anhydride-containing group and an amino group.

In the polar groups represented by $-P(=O)(OH)R^{101}$, as the hydrocarbon groups represented by $R^{101}$ or $R^{102}$, hydrocarbon groups each having 1 to 10 carbon atoms are preferred. More preferably, $R^{101}$ or $R^{102}$ represents an aliphatic group having 1 to 8 carbon atoms which may be substituted (for example, methyl, ethyl, propyl, butyl, pentyl, hexyl, butenyl, pentenyl, hexenyl, 2-chloroethyl, 2-cyanoethyl, cyclopentyl, cyclohexyl, benzyl, phenetyl, chlorobenzyl, bromobenzyl) or an aromatic group which may be substituted (for example, phenyl, tolyl, xylyl, mesityl, chlorophenyl, bromophenyl, methoxyphenyl, cyanophenyl).

In the polar groups represented by $-CONR^{103}R^{104}-$ and $-SO_2NR^{103}R^{104}-$ described above, $R^{103}$ and $R^{104}$ each independently represents a hydrogen atom or a hydrocarbon group (preferably a hydrocarbon group having 1 to 8 carbon atoms which may be substituted). Specific examples of the hydrocarbon groups represented by $R^{103}$ and $R^{104}$ include hydrocarbon groups similar to those represented by $R^{101}$ and $R^{102}$ described above.

Furthermore, the cyclic acid anhydride-containing group is a group containing at least one cyclic acid anhydride. The cyclic acid anhydrides contained include aliphatic dicarboxylic anhydrides and aromatic dicarboxylic anhydrides.

Examples of the aliphatic dicarboxylic anhydrides include succinic anhydride, glutaconic anhydride, maleic anhydride, cyclopentane-1,2-dicarboxylic anhydride, cyclohexane-1,2-dicarboxylic anhydride, cyclohexene-1,2dicarboxylic anhydride and 2,3-bicyclo[2,2,2]octanedicarobxylic anhydride.

Moreover, the cyclic acid anhydride-containing group is a group containing at least one cyclic acid anhydride. The cyclic acid anhydrides contained include aliphatic dicarboxylic anhydrides and aromatic dicarboxylic anhydrides.

Examples of the aliphatic dicarboxylic anhydrides include succinic anhydride, glutaconic anhydride, maleic anhydride, cyclopentane-1,2-dicarboxylic anhydride, cyclohexane-1,2-dicarboxylic anhydride, cyclohexene-1,2-dicarboxylic anhydride and 2,3-bicyclo[2,2,2]-octanedicarobxylic anhydride, and these aliphatic dicarboxylic acids may be substituted, for example, by halogen atoms such as chlorine and bromine, or alkyl groups such as methyl, ethyl, butyl and hexyl.

Also, examples of the aromatic dicarboxylic anhydrides include phthalic anhydride, naphthalenedicarboxylic anhydride, pyridinedicarboxylic anhydride and thiophene-dicarboxylic anhydride. These aromatic dicarboxylic anhydrides may be substituted, for example, by halogen atoms such as chlorine and bromine, alkyl groups such as methyl, ethyl, propyl and butyl, hydroxyl, cyano, nitro or alkoxycarbonyl groups (as carboxyl groups, for example, methoxy and ethoxy).

Of the polar groups of the present invention, the amino group indicates —NH$_2$, —NHR$^{105}$ or —NR$^{105}$R$^{106}$. R$^{105}$ and R$^{106}$ each represents a hydrocarbon group having 1 to 8 carbon atoms, and preferably a hydrocarbon group having 1 to 7 carbon atoms. Specific examples thereof include hydrocarbon groups similar to those represented by R$^1$ described above.

In the resin for dispersion stabilization (PA), at least one kind of specific polar group described above may be combined with at least one end of the main chain of the polymer directly or through a connecting group. The connecting group connecting a main chain moiety to a polar group-containing component is composed of any combination of atomic groups such as carbon-carbon bonds (single or double bond), carbon-hetero atom bonds (as the hetero atom, for example, oxygen, sulfur, nitrogen and silicon atoms) and hetero atom-hetero atom bonds.

More specific examples of the connecting groups include a single connecting group selected from or a connecting group composed of any combination of two or more of atomic groups such as —C(R$^{107}$) (R$^{108}$)— (wherein R$^{107}$ and R$^{108}$ each independently represents a hydrogen atom, a halogen atom (e.g., fluorine, chlorine, bromine), a cyano group, a hydroxyl group or an alkyl group (e.g., methyl, ethyl, propyl)), —(CH=CH)—, —C$_6$H$_{10}$— (wherein —C$_6$H$_{10}$— represents 1,2-, 1,3- or 1,4-cyclohexylene, hereinafter the same),—Ph—, —O—, —S—, —CO—, NR$^{109}$—, —COO—, —SO$_2$—, —CONR$^{109}$—, —SO$_2$NR$^{109}$—, —NHCOO—, —NHCONH— and —SiR$^{109}$R$^{110}$— (wherein R$^{109}$ and R$^{110}$ each independently represents a hydrogen atom or a hydrocarbon group having the same meaning as R$^{101}$ in the above-mentioned polar groups.

The weight average molecular weight of the resins for dispersion stabilization (P) used in the present invention is preferably 1×10$^4$ to 1×10$^6$, and more preferably 2.5×10$^4$ to 2×10$^5$. If the weight average molecular weight is less than 1×10$^4$, the average particle size of the resin particles obtained by polymerization granulation becomes large (for example, larger than 0.5 μm), and the particle size distribution becomes wide. On the other hand, if it exceeds 1×10$^6$, the average particle size of the resin particles obtained by polymerization granulation becomes too large, sometimes resulting in the difficulty of uniformly sizing the average particle size within the preferred range of 0.1 μm to 0.8 μm.

The resins for dispersion stabilization (P) used in the present invention are soluble in organic solvents, and specifically, they are preferably dissolved in an amount of at least 5 parts by weight based on 100 parts by weight of toluene solvent at a temperature of 25° C.

Specifically, the resins for dispersion stabilization (P) used in the present invention are preferably simply obtained by a known method of allowing at least monomers corresponding to the repeating units represented by formula (III) and the above-mentioned multifunctional monomers to coexist, and conducting polymerization by use of polymerization initiators (for example, bisazo compounds or peroxides).

The amount of the polymerization initiators used herein is 0.5 to 15 parts by weight, and preferably 1 to 10 parts by weight, based on 100 parts by weight of the total monomers.

The resin for dispersion stabilization (PA) in which the specific polar group is combined with only one end of at least one main chain of the polymer, a preferred embodiment, can be easily produced by a synthesis method such as a method of allowing each of various reagents to react with an end of a living polymer obtained by known anionic or cationic polymerization (method by ionic polymerization), a method of conducting radical polymerization by use of a polymerization initiator and/or a chain transfer agent containing the specific polar group in its molecule (method by radical polymerization), or a method of allowing a reactive group-containing polymer to react with the end obtained by the anionic or cationic polymerization as described above by the polymer reaction, thereby converting the end to the specific polar group of the present invention.

Specifically, the resins (PA) can be produced according to methods described in reviews, and literatures and patents cited therein, such as P. Dreyfuss & R. P. Quirk, *Encycl. Polym. Sci. Eng.*, 7, 551 (1987), Yoshiki Chujyo & Yuya Yamashita, *Senryo to Yakuhin*, 30, 232 (1985), Akira Ueda & Susumu Nagai, *Kagaku to Kogyo*, 60, 57 (1986).

The weight average molecular weight of the resins for dispersion stabilization (PA) used in the present invention is preferably 1×10$^4$ to 2×10$^5$, and more preferably 2.5×10$^4$ to 2×10$^5$. If the weight average molecular weight is less than 1×10$^4$, the average particle size of the resin particles obtained by polymerization granulation becomes large (for example, larger than 0.5 μm), and the particle size distribution becomes wide. On the other hand, if it exceeds 1×10$^5$, the average particle size of the resin particles obtained by polymerization granulation becomes too large, sometimes resulting in the difficulty of uniformly sizing the average particle size within the preferred range of 0.1 μm to 0.8 μm.

Specifically, the resins for dispersion stabilization (PA) used in the present invention can be produced by (1) a method of polymerizing mixtures of monomers corresponding to the repeating units represented by formula (III), the above-mentioned multifunctional monomers and chain transfer agents containing the above-mentioned specific polar groups by use of polymerization initiators (for example, bisazo compounds or peroxides), (2) a method of conducting polymerization by use of polymerization initiators containing the above-mentioned specific polar groups, without use of the above-mentioned chain transfer agents, (3) a method of using compounds containing the above-mentioned polar groups as both the chain transfer agents and the polymerization initiators, or (4) a method of conducting the polymerization reaction by use of compounds containing amino groups, halogen atoms, epoxy groups or acid halide groups as the substituent groups of the chain transfer agents or the polymerization initiators in the above-mentioned three methods, followed by further polymer reaction to react with these functional groups, thereby introducing the above-mentioned polar groups.

The chain transfer agents used include, for example, mercapto compounds containing the above-mentioned polar groups or substituent groups derivable to the above-mentioned polar groups (for example, thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-mercaptoethyl)amino]propionic acid, N-(3-mercaptopropionyl)alanine, 2-mercaptoethanesulfonic acid, 3-mercaptopropanesulfonic acid, 4-mercaptobutanesulfonic acid, 2-mercaptoethanol, 3-mercapto-1,2-propanediol, 1-mercapto-2-propanol, 3-mercapto-2-butanol, mercaptophenol, 2-mercaptoethylamine, 2-mercaptoimidazole and 2-mercapto-3-pyridinol) and iodinated alkyl compounds containing the above-mentioned polar groups or substituent groups derivable to the above-mentioned polar groups (for example, iodoacetic acid, iodopropionic acid, 2-iodoethanol, 2-iodoethanesulfonic acid and 3-iodopropane-sulfonic acid). Preferred examples thereof include mercapto compounds.

Furthermore, the polymerization initiators containing the above-mentioned polar group or substituent group derivable to the above-mentioned polar group include azobis compounds, such as 4,4'-azobis(4-cyanovaleric acid), 4,4'-azobis(4-cyanovaleric acid chloride), 2,2'-azobis(2-cyanopropanol), 2,2'-azobis(2-cyanopentanol), 2,2'-azobis[2-(5-hydroxy-3,4,5,6,-tetrahydropyrimidine-2-yl)propane], 2,2'-azobis{2-methyl-N-[1,1-bis(hydroxymethyl)-2-hydroxyethyl]propioamide}, 2,2'-azobis{2-methyl-N-[1,1-bis(hydroxymethyl)ethyl]propioamide} and 2,2'-azobis(2-amidinopropane).

The amount of these chain transfer agents or the polymerization initiators used are each 0.1 to 15 parts by weight, and preferably 0.5 to 10 parts by weight, based on 100 parts by weight of the total monomers.

The dispersed resin particles used in the present invention are generally produced by heat polymerization of the resins for dispersion stabilization (P), the monomers (A) and the monomers (B) or macromonomers (MA) as described above in the nonaqueous solvents in the presence of polymerization initiators such as benzoyl peroxide, bisazoisobutyronitrile and butyllithium. Specifically, there are (1) a method of adding the polymerization initiator to a mixed solution of the resin for dispersion stabilization (P), the monomer (A) and the monomer (B) or macromonomer (MA), (2) a method of adding dropwise the monomer (A) and the monomer (B) or macromonomer (MA) together with the polymerization initiator to a solution in which the resin for dispersion stabilization (P) is dissolved, (3) a method of arbitrarily adding the polymerization initiator and the remainders of the monomer (A) and the monomer (B) or macromonomer (MA) to a mixed solution containing the total amount of the resin for dispersion stabilization (P) and parts of the monomer (A) and the monomer (B) or macromonomer (MA), and (4) a method of arbitrarily adding a mixed solution of the resin for dispersion stabilization (P), the monomer (A) and the monomer (B) or macromonomer (MA) to the nonaqueous solvent together with the polymerization initiator. The dispersed resin particles can be produced using any of these methods.

The total amounts of the monomer (A) and the monomer (B) or macromonomer (MA) are each preferably 10 parts to 100 parts by weight, and more preferably 10 parts to 80 parts by weight, based on 100 parts by weight of nonaqueous solvent.

The amount of the resin for dispersion stabilization (P) is preferably 1 parts to 50 parts by weight, more preferably 3 parts to 50 parts by weight, still more preferably 5 to 30 parts, and most preferably 5 to 25 parts, based on 100 parts by weight of the total monomers used above.

The amount of the polymerization initiator is suitably 0.1% to 10% by weight based on the total monomers. The polymerization temperature is preferably about 40° C. to about 180° C., and more preferably 50° C. to 120° C. The reaction time is preferably 3 hours to 15 hours.

When the above-mentioned polar solvents such as alcohols, ketones, ethers and esters are used in combination with the nonaqueous solvents used in the reaction, or when unreacted monomers of the monomers (A) and the monomer (B) or macromonomers (MA) to be subjected to polymerization granulation remain, it is preferred that the polar solvents or the unreacted monomers are removed by distillation under heating to temperatures equal to or higher than boiling points of the solvents or the monomers, or under reduced pressure.

The nonaqueous dispersed resin particles produced according to the present invention as described above are present as particles which are fine and uniform in particle size distribution. The mean particle size thereof is 0.1 µm to 0.8 µm, and more preferably 0.15 µm to 0.5 µm. This particle size can be determined with CAPA-500 (trade name, manufactured by Horiba, Ltd.). At the same time, they show very stable dispersibility, and particularly, even when repeatedly used in a recording device for a long period of time, they are good in dispersibility and easily redispersed, so that contamination due to adhesion of the resin particles to each part of the device is not observed at all.

Furthermore, the rapid treatment by heating after ink image formation easily forms a strong coating on a surface of a support for a lithographic printing plate, thereby exhibiting the good fixing property. This makes it possible to print a large number of sheets (high press life) also in offset printing.

The oil-based ink of the present invention bringing about the effects as described above becomes available according to the insoluble latexes of the present invention.

Previously, in the compounds used as the monomers (A), for example, methacrylates, acrylates, vinyl esters of fatty acids and allyl esters of fatty acids, the carbon number of the alkyl groups contained in their molecules was usually 1 to 4, and at most 6 or less. This was for avoiding the problem that the formed resins were solubilized in nonaqueous solvents to cause difficulty in particle formation, or that the softening point of the formed resins was lowered to become weak to thermal changes, resulting in deterioration of the keeping quality. However, the dispersed resin particles of the present invention obtained by polymerization granulation, allowing the monomer (B) copolymerizable with the monomer (A) to concurrently exist in a small amount (0.1% to 15% by weight) based on the monomer (A), together with the monomer (A) insolubilized by polymerization, did not cause solubilization of the resin and a decrease in softening point of the resin to a degree becoming unpractical as described above, formed monodisperse particles having a desired mean particle size, and were significantly improved in redispersibility.

The dispersed resin particles of the present invention obtained by polymerization granulation, allowing the macromonomer (MA) composed of a copolymerization component soluble in a nonaqueous solvent to exist together with the monomer (A) insolubilized by polymerization, are considered to be caused by the presence of a soluble component contained in the macromonomer (MA) in the particle interface of the insolubilized and dispersed resin, which brings about some kind of improvement on the particle surface to improve the affinity for a dispersing medium and increase the salvation with the dispersing medium, resulting in prevention of coagulation of the resin particles.

From these, it is considered that coagulation and precipitation of the insoluble particles are inhibited, thereby significantly improving the redispersibility.

As described above, the use of the resins for dispersion stabilization (P) of the present invention improves the dispersion stability, and the resins are condensed in the oil-based ink when the ink is repeatedly used for a long period of time, thereby improving the fear of raising various problems.

It is preferred that the oil-based ink used in the present invention contains coloring materials as coloring components for detecting printing plates after processing, together with the above-mentioned dispersed resin particles.

As the coloring materials, any can be used as long as they are pigments and dyes previously used in oil-based ink compositions or liquid developers for electrostatic photography.

As the pigments, ones generally used in the technical field of printing can be used, regardless of inorganic pigments or organic pigments. Specifically, known pigments can be used without particular limitation, such as carbon black, cadmium red, molybdenum red, Chrome Yellow, cadmium yellow, Titan Yellow, chromiumoxide, pyridian, Titan Cobalt Green, ultramarine blue, Prussian blue, cobalt blue, azo pigments, phthalocyanine pigments, quinacridone pigments, isoindolinone pigments, dioxazine pigments, threne pigments, perylene pigments, perynone pigments, thioindigo pigments, quinophthalone pigments and metal complex pigments.

Preferred examples of the dyes include oil-soluble dyes such as azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metallophthalocyanine dyes.

These pigments and dyes may be used alone or can be used appropriately in combination. They are preferably contained within the range of 0.01% to 5% by weight based on the whole ink.

These coloring materials may be dispersed by themselves in the nonaqueous solvents as dispersed particles, separately from the dispersed resin particles, or allowed to be contained in the dispersed resin particles. When they are allowed to be contained in the dispersed resin particles, the pigments are generally coated with resin materials of the dispersed resin particles to form resin-coated particles, and for the dyes, surface portions of the dispersed resin particles are generally colored therewith to form colored particles.

As one of the methods, there is a method described in JP-A-57-48738 in which a dispersed resin is dyed with a preferable dye. As another method, there is a method described in JP-A-53-54029 in which a dispersed resin is allowed to chemically combine with a dye, or a method described in JP-B-44-22955 (the term "JP-B" as used herein means an "examined Japanese patent publication") in which a monomer previously containing a dye is used in the production by polymerization granulation to form a dye-containing copolymer.

The dispersed resin particles and the colored particles (or coloring material particles) contained in the oil-based ink of the present invention are electrically detectable particles positively or negatively charged.

It is attainable to impart the electric detecting property to these particles by appropriately utilizing the technology of developers for wet electrostatic photography. Specifically, it is carried out by using electric detecting materials described in "Recent Developments and Utilization of Electrophotographic Development Systems and Toner Materials", pages 139 to 148, "Fundamental and Application of Electrophotographic Techniques", edited by Denshi Shashin Gakkai, pages 497 to 505 (Corona, 1988), and Yuji Harazaki, "Electro-photography", 16 (No. 2), 44 (1977), and other additives.

Specifically, it is described, for example, in British Patents 893,429 and 934,038, U.S. Pat. Nos. 1,122,397, 3,900,412 and 4,606,989, JP-B-4-51023, JP-B-6-19595, JP-B-6-19596, JP-B-6-23865, JP-A-60-185963 and JP-A-2-13965.

Charge regulating agents are preferably added in an amount of 0.001 part to 1.0 part by weight based on 1000 parts by weight of dispersing medium or carrier liquid. Various additives may be further added if desired, and the upper limit of the total amount of these additives is restricted by the electric resistance of the oil-based ink. That is, if the electric resistance of the ink with the dispersed particles removed is lower than $10^9$ Ωcm, it becomes difficult to obtain continuous tone images of good quality. It is therefore necessary to control the amount of each additive added within this limit.

The water-resistant supports having lithographically printable hydrophilic surfaces used in the present invention may be any as long as they provide hydrophilic surfaces suitable for lithography, and supports used for conventional offset printing can be used as such.

Preferably, the surfaces of the image receiving layers receiving ink images are hydrophilic surfaces having a contact angle with water of 5 degrees or less, more preferably 0 degree, which give printed material generating no ink stains in non-image areas as offset printing plates.

In the present invention, the smoothness of the surface of the image receiving layer is preferably 50 (second/10 ml) or more, and more preferably 80 (second/10 ml) or more, by the Beck smoothness.

Here, the Beck smoothness can be measured with a Beck smoothness tester. The Beck smoothness tester is a tester for measuring a time required for a definite amount (10 ml) of air to pass through between a test piece and a glass surface under reduced pressure, wherein the test piece is pressed to a highly smoothly finished circular glass plate having a hole at its center at a definite pressure (1 kg/cm$^2$).

Defects and blurs of ink images formed by the magnitude of unevenness of the image receiving layers are preferably inhibited at a Beck smoothness of 50 or more.

Preferred embodiments thereof include water-resistant supports comprising water-resistant substrates having provided thereon image receiving layers having lithographically printable hydrophilic surfaces (hereinafter also referred to as a precursor for lithographic printing).

Examples of the water-resistant supports include a plastic sheet, paper for which printability is provided, an aluminum sheet, a zinc sheet, a bimetal sheet (e.g., a copper-aluminum sheet, a copper-stainless steel sheet and a chromium-copper sheet), a trimetal sheet (e.g, a chromium-copper-aluminum sheet, a chromium-lead-iron sheet, a chromium-copper-stainless steel sheet), preferably having a thickness of 0.1 to 3 mm, most preferably 0.1 to 1 mm.

Furthermore, they include paper having a thickness of 80 μm to 200 μm subjected to water-resistant treatment, paper laminated with plastic films or metal foil, or a plastic film.

Preferably, the water-resistant support has electroconductivity, and a specific electric resistance of $10^{10}$ Ωcm or less at least at an area directly under the image receiving layer. The specific electric resistance is preferably $10^8$ Ωcm or less.

In order to provide the specific electric resistance of at least an area directly under the image receiving layer on a substrate such as paper and a film, for example, a layer comprising an electroconductive filler such as carbon black and a binding agent is coated, a metal foil is stuck, and a metal is evaporated.

On the other hand, examples of the support having an electroconductivity as a whole include electroconductive paper to which sodium chloride is impregnated, a plastic film with which an electroconductive filler is mixed, and a metal plate such as aluminum.

In the above electroconductivity range, when ink droplets which have been charged in ink jet recording by electric field control are adhered to the image-receiving layer, the charge of the ink droplets is disappeared quickly through earth, and a clear image having no disorder is formed.

The specific electric resistance (volume specific electric resistance, electric resistivity) was measured by a three-terminal method using a guard electrode according to JIS K-6911.

The support having an electroconductivity as a whole is explained below.

For example, the support is obtained by providing both sides of an electroconductive precursor paper obtained by impregnating sodium chloride into a substrate with a water-resistant electroconductive layer.

In the present invention, the precursor paper used for the substrate include wood pulp paper, synthetic pulp paper and mixed paper of wood pulp paper and synthetic pulp paper as they are.

The electroconductive layer is explained below.

The electroconductive layer is formed by coating a layer containing an electroconductive filler and a binding agent to both of the above electroconductive paper. The thickness of the electroconductive layer is 5 $\mu$m to 20 $\mu$m.

The electroconductive filler includes particulated carbon black, graphite, metal powder (e.g., silver powder, copper powder, nickel powder), stannic oxide powder, flake aluminum or nickel, fiber carbon, brass, aluminum, copper and stainless steel.

The resin used for the binding agent can be selected from various resins appropriately, and specifically, includes hydrophobic resins (e.g., acrylic resin, vinyl chloride resin, styrene resin, styrene-butadiene resin, styrene-acrylate resin, urethane resin, vinylidene chloride resin, vinyl acetate resin) and hydrophilic resins (e.g., polyvinyl alcohol resin, cellulose derivative resin, starch and derivatives thereof, polyacrylamide resin, styrenemaleic anhydride copolymer).

The electroconductive layer may be formed by laminating an electroconductive thin film. Examples of the electroconductive thin film include a metal foil and an electroconductive plastic film. More specifically, the metal foil laminated material includes an aluminum foil and the electroconductive plastic film laminated material includes a polyethylene resin with which carbon black is mixed. The aluminum foil may be hard or soft, and the thickness thereof is preferably 5 $\mu$m to 20 $\mu$m.

The polyethylene resin laminated film with which carbon black is mixed is preferably obtained by an extrusion laminating method. The method comprises melting polyolefin by heating to form a film, immediately pressing the film on precursor paper, and cooling it for laminating. Various apparatus for the method are known. The thickness of the laminated layer is preferably 10 $\mu$m to 30 $\mu$m. As the support having an electroconductivity as a whole, a plastic film having an electroconductivity as a substrate and a metal sheet can be used as they are so long as the water-resistivity is satisfied.

The plastic film having an electroconductivity includes polypropylene or polyester film with which an electroconductive filer such as carbon fiber or carbon black is mixed. The metal sheet includes aluminum. The thickness of the substrate is preferably 80 $\mu$m to 200 $\mu$m. If it is less than 80 $\mu$m, strength as a printing plate is insufficient. If it exceeds 200 $\mu$m, handling properties such as a transportability in a drawing apparatus are decreased.

The composition for providing a layer having an electroconductivity is explained below.

Forming of an electroconductive layer on a water-resistant substrate is carried out in the same manner as in the above-described formation of the support having an electroconductivity as a whole. That is, one surface of the substrate is coated with a layer containing an electroconductive filer and a binding agent having a thickness of 5 $\mu$m to 20 $\mu$m, or laminated with a metal foil or a plastic film having an electroconductivity.

Furthermore, in addition to the above methods, for example, a metal vaporization film such as aluminum, tin, palladium or gold may be coated on a plastic film.

According to the above methods, a support having a specific electric resistance of $10^{10}$ $\Omega$cm or less as a whole of the support.

As to the support used in the present invention, the smoothness of a surface on the side adjacent to the image receiving layer is preferably adjusted to 300 (second/10 ml) or more, more preferably 900 (second/10 ml) to 3000 (second/10 ml), and most preferably 1000 (second/10 ml) to 3000 (second/10 ml), by the Beck smoothness.

The image reproducibility and the press life can be further improved by restricting the smoothness of the surface on the side adjacent to the image receiving layer of the support to 300 (second/10 ml) or more by the Beck smoothness. Such an improving effect is obtained even if the smoothness of the surface of the image receiving layer is the same, and it is considered that an increase in the smoothness of the surface of the support has improved the adhesive quality between the image area and the image receiving layer.

The highly smooth surface of the water-resistant support thus restricted means a surface directly coated with the image receiving layer. For example, when an under layer or an overcoat layer described later is provided on the support, it means a surface of the under layer or the overcoat layer.

The image receiving layer whose surface state is adjusted as described above without the influence of unevenness of the surface of the support is sufficiently maintained thereby, which makes it possible to further improve the image quality.

As methods for establishing the smoothness within the above-mentioned range, various known methods can be used. Specifically, such methods include a method of melt-adhering a resin to a surface of a substrate, and a method of adjusting the Beck smoothness of a surface of a support by calendering with a highly smooth hot roller.

As the above-mentioned method of melt-adhering the resin, coating by extrusion lamination is preferred in the present invention. The support adjusted to a desired smoothness can be produced by coating by this extrusion lamination. The extrusion lamination is a method in which a resin is melted into a film, which is immediately pressed to base paper, followed by cooling, thus laminating the base paper with the film, and various apparatuses are known.

The thickness of the resin layer thus laminated is 10 $\mu$m or more in terms of production stability, and preferably 10 $\mu$m to 30 $\mu$m.

Furthermore, in the present invention, the under layer can be provided between the support and the image receiving layer for improving the water resistance and the interlayer adhesive quality as described above, and a backcoat layer (back surface layer) can be provided on a surface of the support opposite to the image receiving layer for preventing curls. It is preferred that the backcoat layer has a smoothness ranging from 150 (second/10 ml) to 700 (second/10 ml).

When a printing plate is supplied to an offset printer, this allows the printing plate to be accurately set on the printer without the occurrence of deviation or slippage.

When the under layer and the backcoat layer of the support are each adjusted to such a smoothness, it is preferred that the smoothness is controlled by repeating a calender treatment step plural times, for example, by once conducting calender treatment after formation of the image receiving layer and conducting it again after formation of the backcoat layer, or by a combination of the adjustment with respect to compositions of the under layer and the backcoat layer described later, for example, the ratio and the grain size of a pigment, and the adjustment of calender treatment conditions.

The backcoat layer is formed by coating and drying or laminating a coating liquid containing a resin, a pigment or the like on a support. The resin can be selected from various resins appropriately. Specifically, they include those described for the above-described electroconductive layer (under layer).

Furthermore, the pigments include clay, kaolin, talc, diatom earth, calcium carbonate, aluminum hydroxide, magnesium hydroxide, titanium oxide and micas. In order to attain the desired smoothness, these pigments are preferably used by appropriately selecting their grain size. For example, a relatively high smoothness is required in the under layers, so that pigments from which small-sized and large-sized grains are cut off, specifically, having a grain size of about 0.5 $\mu$m to about 10 $\mu$m are preferably used. The pigments as described above are preferably used at a ratio of 80 parts to 200 parts by weight in the backcoat layers based on 100 parts by weight of resin. In order to obtain excellent water resistance, the under layers and the backcoat layers effectively contain water resistance imparting agents such as melamine resins and polyamide epichlorohydrin resins. The above-mentioned grain size can be measured using a scanning electron microscopic (SEM) photograph. When the grain is not spherical, the size is a diameter determined by converting a projected area to a circle.

When the lithographic printing plate precursor of the present invention is prepared, generally, a solution containing components for the under layer is applied onto one side of the support, followed by drying to form the under layer, if necessary, a solution containing components for the backcoat layer is further applied onto the other side of the support, followed by drying to form the backcoat layer, if necessary, and subsequently, a coating solution containing components for the image receiving layer is applied, followed by drying to form the image receiving layer. The amounts of the image receiving layer, the under layer and the backcoat layer coated are each 1 g/m$^2$ to 30 g/m$^2$, and particularly suitably 6 g/m$^2$ to 20 g/m$^2$.

More preferably, the thickness of the water-resistant support provided with the under layer and the backcoat layer ranges from 90 $\mu$m to 130 $\mu$m, and preferably from 100 $\mu$m to 120 $\mu$m.

The image receiving layer having is provided on the water-resistant support, and the thickness thereof is preferably 5 $\mu$m to 50 $\mu$m.

For example, the image receiving layer comprises a water-soluble binder, an inorganic pigment and a water-resistance imparting agent as its main component. The binder includes water-soluble resins, such as PVA, modified PVA (e.g., carboxyl PVA), starch and derivatives thereof, CMC, hydroxyethyl cellulose, casein, gelatin, polyacrylate, polyvinylpyrrolidone, poly(vinyl methyl ether), a copolymer of vinyl acetate and crotonic acid, a copolymer of maleic anhydrate, and a copolymer of styrene and maleic acid.

The water resistance imparting agent includes glyoxal, a primary condensation product of a melamine formaldehyde resin, an urea formaldehyde resin or the like, a modified polyamide resin such as a methylated proamide resin, and a polyamide-polyamine-epichlorohydrin resin. Examples of the inorganic pigments include clay, kaolin, calcium carbonate, silica, titanium oxide, zinc oxide, barium sulfate, alumina and talc. Among these, silica is preferred.

In addition, the image receiving layer may contain a crosslinking catalyst such as ammonium chloride or a silane coupling agent.

A method for forming an image on the above-mentioned precursor for lithographic printing (hereinafter also referred to as a "master") is described below. As a device system for performing such a method, there is, for example, one shown in FIG. 1.

The device system shown in FIG. 1 comprises an ink jet recording device 1 using an oil-based ink.

As shown in FIG. 1, pattern information of images (graphics or sentences) to be formed on a master 2 is first supplied from an information supply source such as a computer 3 to the ink jet recording device 1 using oil-based ink through a transmittal means such as a path 4. A head for ink jet recording 10 of the recording device 1 stores oil-based ink therein, and sprays fine droplets of the ink on the master 2 according to the above-mentioned information, when the master 2 passes through in the recording device 1. Thereby, the ink adheres to the master 2 according to the above-mentioned pattern.

Thus, the image formation on the master 2 is completed to obtain a processing master (a printing precursor for processing).

Figure 2:
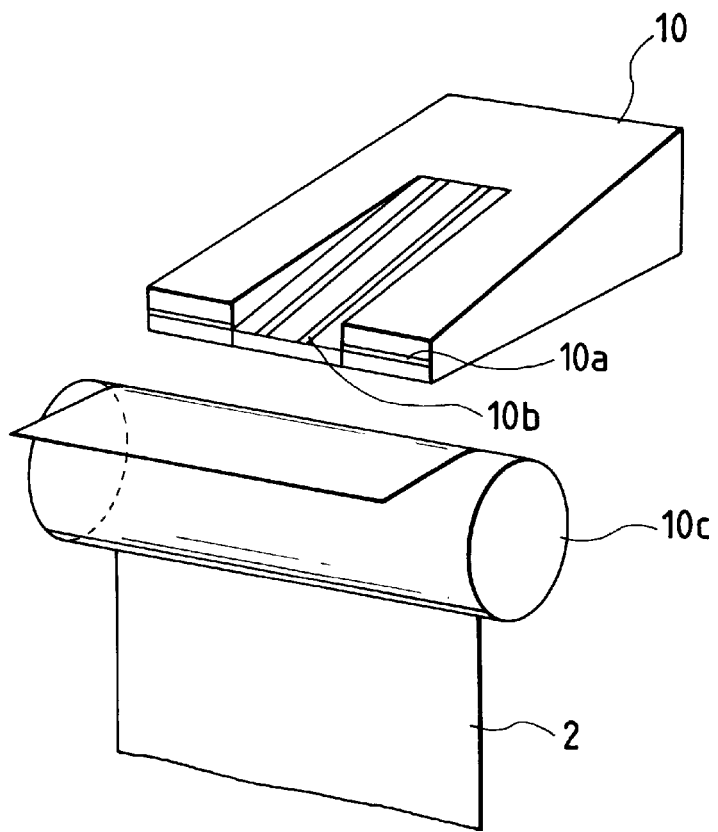
FIG. 2 is a schematic view showing a main part of an ink jet recording device used in the present invention.
Figure 3:
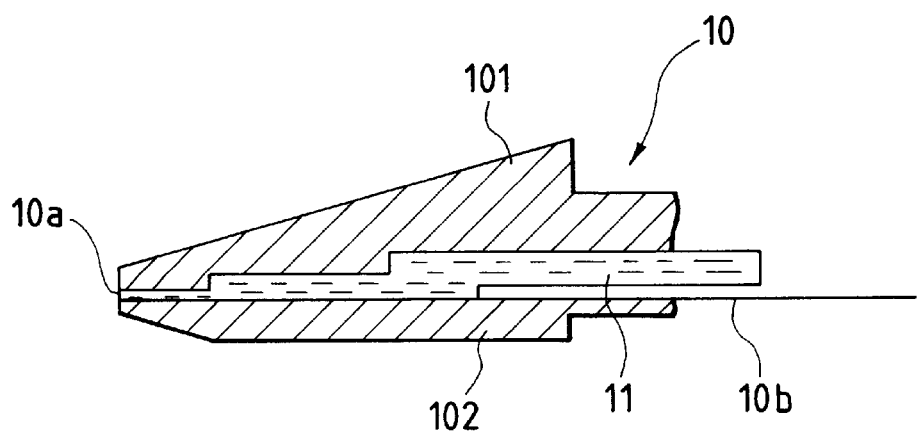
FIG. 3 is a partially sectional view showing a head ink jet recording device used in the present invention.

An embodiment of the ink jet recording device as shown in the device system of FIG. 1 is shown in FIG. 2 and FIG. 3. In FIG. 2 and FIG. 3, members common to the members in FIG. 1 are designated by the common reference characters. FIG. 2 is a schematic view showing a main part of such an ink jet recording device, and FIG. 3 is a sectional view showing a part of the head.

The head 10 attached to the ink jet recording device has a slit between an upper unit 101 and a lower unit 102, a leading edge thereof forms a discharge slit 10$a$, a discharge electrode 10$b$ is disposed in the slit, and the inside of the slit is filled with oil-based ink 11, as shown in FIG. 2 and FIG. 3.

In the head 10, voltage is applied to the discharge electrode 10$b$ according to a digital signal of pattern information of images. As shown in FIG. 2, a counter electrode 10$c$ is provided opposite to the discharge electrode 10$b$, and the master 2 is placed on the counter electrode 10$c$. The application of voltage forms a circuit between the discharge electrode 10$b$ and the counter electrode 10$c$, and the oil-based ink 11 is discharged from the discharge slit 10$a$ of the head 10, thereby forming images on the master 2 placed on the counter electrode 10$c$.

It is preferred that the width of the discharge electrode 10$b$ is as narrow as possible in its leading edge, for forming images of high quality, for example, conducting printing.

For example, the head of FIG. 3 is filled with oil-based ink, the discharge electrode 10$b$ whose leading edge has a width of 20 $\mu$m is used, the distance between the discharge electrode 10$b$ and the counter electrode 10$c$ is adjusted to 1.5 mm, and a voltage of 3 kV is applied between these electrodes for 0.1 millisecond, whereby 40 $\mu$m-dot printed letters can be formed on the master 2.

Production examples of resins for dispersion stabilization, production examples of latex particles and examples of the present invention are shown below to illustrate the effects of the present invention in more detail, but it is to be understood that the present invention is not limited thereto. All parts, weights, ratios and the like are by weight unless otherwise indicated.

PRODUCTION EXAMPLE 1
Resin for Dispersion Stabilization (PA-1)

A mixed solution of 100 g of octadecyl methacrylate, 0.6 g of divinylbenzene and 200 g of toluene was heated to a temperature of 85° C. with stirring under a steam of nitrogen. Then, 4.0 g of 2,2'-azobis(isobutronitorile) cyclohexane-1-carbonitrile) (referred to as "A.I.B.N." simply) was added thereto and allowed to react for 4 hours. Further, 1.0 g of A.I.B.N. was added thereto and allowed to react for 2 hours, and furthermore, 0.5 g of A.I.B.N. was added thereto and allowed to react for 2 hours. After cooling, the mixed solution was reprecipitated with 1.5 liters of methanol. The powder was collected and then dried to obtain 88 g of a white powder.

The Mw of the resulting polymer was $3.3\times10^4$ (a value converted to polystyrene by the G.P.C. method, hereinafter the same).

PRODUCTION EXAMPLES 2 to 9
Resins for Dispersion Stabilization (P-2) to (P-9)

Respective resins for dispersion stabilization were produced in the same manner as in Production Example 1 with the exception that monomers (A) and monomers (D) described in Table 1 shown below were each used in place of octadecyl methacrylate and divinylbenzene in Production Example 1. The Mw of the respective resins (P) was $3.0\times10^4$ to $5\times10^4$.

TABLE 1

| Ex.[1] | Resin | Monomer (A) | Monomer (D) |
|---|---|---|---|
| 2 | P-2 | Dodecylmethacrylate: 100 g | Divinylbenzene: 0.8 g |
| 3 | P-3 | Tridecylmethacrylate: 100 g | Divinylbenzene: 0.7 g |
| 4 | P-4 | Octylmethacrylate: 20 g<br>Dodecylmethacrylate: 80 g | Trivinylbenzene: 0.5 g |
| 5 | P-5 | Octadecylmethacrylate: 70 g<br>Butylmethacrylate: 30 g | Ethyleneglycol dimethacrylate: 1.5 g |
| 6 | P-6 | Dodecylmethacrylate: 95 g<br>N,N-Dimethylaminoethyl-methacrylate: 5 g | Ethyleneglycol diacrylate: 0.9 g |
| 7 | P-7 | Octadecylmethacrylate: 96 g<br>2-(Trimethoxysilyloxy)-methacrylate: 4 g | Vinyl methacrylate: 1.2 g |
| 8 | P-8 | Hexadecylmethacrylate: 100 g | Vinylbenzene: 0.8 g |
| 9 | P-9 | Tetradecylmethacrylate: 100 g | Ally methacrylate: 3.0 g |
| 10 | P-10 | Octadecylmethacrylate: 95 g<br>Methacrylic acid: 5 g | Diethyleneglycol dimethacrylate: 2.5 g |
| 11 | P-11 | Dodecylmethacrylate: 90 g<br>Vinylacetate: 10 g | Divinyladipinate: 4.0 g |
| 12 | P-12 | Octadecylmethacrylate: 92 g<br>2-Hydroxyethylmethacrylate: 8 g | Triethylene glycol dimethacrylate: 3.0 g |
| 13 | P-13 | Dodecylmethacrylate: 80 g<br>Styrene: 20 g | Divinylbenzene: 0.9 g |
| 14 | P-14 | Dodecylmethacrylate: 92 g<br>N-Vinylpyrrolidone: 8 g | Trimethylolpropane methacrylate: 3.5 g |

[1]Production Example

PRODUCTION EXAMPLE 101
Resin for Dispersion Stabilization (PA-1)

A mixed solution of 97 g of octadecyl methacrylate, 3 g of thioglycolic acid, 5.0 g of divinylbenzene and 200 g of toluene was heated to a temperature of 85° C. with stirring under a steam of nitrogen. Then, 0.8 g of 1,1'-azobis (cyclohexane-1-carbonitrile) (referred to as "A.C.H.N." simply) was added thereto and allowed to react for 4 hours. Further, 0.4 g of A.C.H.N. was added thereto and allowed to react for 2 hours, and furthermore, 0.2 g of A.I.B.N. was added thereto and allowed to react for 2 hours. After cooling, the mixed solution was reprecipitated with 1.5 liters of methanol. The powder was collected and then dried to obtain 88 g of a white powder.

The Mw of the resulting polymer was $3\times10^4$.

PRODUCTION EXAMPLES 102 to 109
Resins for Dispersion Stabilization (PA-2) to (PA-9)

Respective resins for dispersion stabilization were produced in the same manner as in Production Example 1 with the exception that monomers (A) and monomers (D) described in Table 2 shown below were each used in place of octadecyl methacrylate and divinylbenzene in Production Example 101.

TABLE 2

| Ex.[1] | Resin | Monomer (A) | Monomer (D) |
|---|---|---|---|
| 102 | PA-2 | Dodecylmethacrylate: 97 g | Divinylbenzene: 6 g |
| 103 | PA-3 | Tridecylmethacrylate: 97 g | Divinylbenzene: 4 g |
| 104 | PA-4 | Octylmethacrylate: 17 g<br>Dodecylmethacrylate: 80 g | Trivinylbenzene: 2.5 g |
| 105 | PA-5 | Octadecylmethacrylate: 70 g<br>Butylmethacrylate: 27 g | Ethyleneglycol dimethacrylate: 8 g |
| 106 | PA-6 | Dodecylmethacrylate: 92 g<br>N,N-Dimethylaminoethyl-methacrylate: 5 g | Ethyleneglycol vinylmethacrylate: 10 g |
| 107 | PA-7 | Octadecylmethacrylate: 93 g<br>2-(Trimethoxysilyloxy)-methacrylate: 4 g | Triethyleneglycol diacrylate: 7 g |
| 108 | PA-8 | Hexadecylmethacrylate: 97 g | Divinyladipinate: 11 g |
| 109 | PA-9 | Tetradecylmethacrylate: 97 g | Polyethyleneglycol #400 diacrylate: 12 g |

[1]Production Example

PRODUCTION EXAMPLE 110
Resin for Dispersion Stabilization (PA-10)

A mixed solution of 97 g of octadecyl methacrylate, 3 g of thiomalic acid, 4.5 g of divinylbenzene, 150 g of toluene and 50 g of ethanol was heated to a temperature of 60° C. with stirring under a steam of nitrogen. Then, 0.5 g of A.I.B.N. was added thereto and allowed to react for 5 hours. Furthermore, 0.3 g of A.I.B.N. was added thereto and allowed to react for 3 hours, and moreover, 0.2 g of A.I.B.N. was added thereto and allowed to react for 3 hours. After cooling, the mixed solution was reprecipitated with 2 liters of methanol. The powder was collected and then dried to obtain 85 g of a white powder.

The Mw of the resulting polymer was $3.5\times10^4$.

PRODUCTION EXAMPLES 111 TO 116
Resins for Dispersion Stabilization (PA-11) to (PA-16)

Respective resins for dispersion stabilization were produced in the same manner as in Production Example 110 with the exception that mercapto compounds described in Table 3 shown below were each used in place of thiomalic acid in Production Example 110.

TABLE 3

| Ex[1] | Resin (PA) | Mercapto Compound | Mw of PA |
|---|---|---|---|
| 111 | PA-11 | 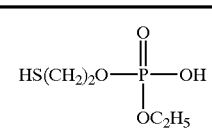 | $3.6\times10^4$ |
| 112 | PA-12 | 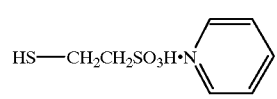 | $2.9\times10^4$ |

TABLE 3-continued

| Ex[1] | Resin (PA) | Mercapto Compound | Mw of PA |
|---|---|---|---|
| 113 | PA-13 | HS—C$_6$H$_4$—COOH (2-mercaptobenzoic acid) | $3.8 \times 10^4$ |
| 114 | PA-14 | HS—CH$_2$CH$_2$—O—P(=O)(OH)—OH | $3.3 \times 10^4$ |
| 115 | PA-15 | HS—CH$_2$CH$_2$NHCO(CH$_2$)$_2$COOH | $3.7 \times 10^4$ |
| 116 | PA-16 | HS(CH$_2$)$_2$N(CH$_3$)$_2$ | $3.5 \times 10^4$ |

[1]Production Example

PRODUCTION EXAMPLE 117
Resin for Dispersion Stabilization (PA-17)

A mixed solution of 94 g of hexadecyl methacrylate, 0.5 g of divinylbenzene, 150 g of toluene and 50 g of isopropyl alcohol was heated to a temperature of 90° C. with stirring under a steam of nitrogen. Then, 6 g of 2,2'-azobis (4cyanovaleric acid) (referred to as "A.C.V." simply) was added thereto and allowed to react for 8 hours. After cooling, the mixed solution was reprecipitated with 1.5 liters of methanol. The powder was collected and then dried to obtain 83 g of a white powder.

The Mw of the resulting polymer was $6.5 \times 10^4$.

PRODUCTION EXAMPLE 118
Resin for Dispersion Stabilization (PA-18)

A mixed solution of 92 g of docosanyl methacrylate, 1.5 g of ISP-22GA (manufactured by Okamura Seiyu Co., Ltd.), 150 g of toluene and 50 g of ethanol was heated to a temperature of 80° C. with stirring under a steam of nitrogen. Then, 8 g of 4,4'-azobis(4-cyanopentanol) was added thereto and allowed to react for 8 hours. After cooling, the mixed solution was reprecipitated with 1.5 liters of methanol. The powder was collected and then dried to obtain 78 g of a white powder.

The Mw of the resulting polymer was $4.1 \times 10^4$.

PRODUCTION EXAMPLE 119
Resin for Dispersion Stabilization (PA-19)

A mixed solution of 95 g of octadecyl methacrylate, 5 g of 2-mercaptoethylamine, 5 g of divinylbenzene and 200 g of toluene was heated to a temperature of 85° C. with stirring under a steam of nitrogen. Then, 0.7 g of A.C.H.N. was added thereto and allowed to react for 8 hours.

Then, 8 g of glutaconic anhydride and 1 ml of concentrated sulfuric acid were added thereto and allowed to react for 6 hours. After-cooling, the reaction solution was reprecipitated with 1.5 liters of methanol. The powder was collected and then dried to obtain 83 g of a white powder.

The Mw of the resulting polymer was $3.1 \times 10^4$.

PRODUCTION EXAMPLE 201
Latex Particles (D-1)

A mixed solution of 16 g of the resin for dispersion stabilization (P-1), 100 g of vinyl acetate, 0.8 g of octadecyl methacrylate and 348 g of Isoper H was heated to a temperature of 70° C. with stirring under a steam of nitrogen. As a polymerization initiator, 0.8 g of 2,2'-azobis (isovaleronitrile) (referred to as "A.I.V.N." simply) was added thereto and allowed to react for 3 hours. The solution became clouded 20 minutes after addition of the initiator, and the reaction temperature increased up to 88° C. Further, 0.5 g of the initiator was added thereto and allowed to react for 2 hours. Then, the temperature was elevated to 100° C. and the resulting solution was stirred for 2 hours to remove unreacted vinyl acetate by distillation. After cooling, the product was passed through a 200-mesh nylon cloth. The resulting white dispersion was a latex having a rate of polymerization of 93% and an average particle size of 0.22 μm. The particle size was measured with a CAPA-500 (manufactured by Horiba, Ltd.).

A part of the above-mentioned white dispersion was centrifuged by use of a centrifuge (the number of revolution: $1 \times 10^4$ r.p.m., the time of revolution: 1 hour), and resin particles precipitated were collected and dried. The weight average molecular weight (Mw) and the glass transition point (Tg) of the resin particles were measured.

As a result, the Mw was $8 \times 10^4$ (a value converted to polystyrene by G.P.C.), and the Tg was 38° C.

PRODUCTION EXAMPLES 202 TO 211
Latex Particles (D-2) to (D-11)

Latex particles (D-2) to (D-11) of the present invention were produced in the same manner as in Production Example 1 described above with the exception that resins for dispersion stabilization and monomers (C) (used in an amount of 0.005 mol) described in Table 4 shown below were each used in place of the resin for dispersion stabilization P-1 and octadecyl methacrylate used in Production Example 1 of latex particles.

TABLE 4

| Production Example | Resin Particles (D) | Resin (P) (PA) | | Monomer (B) |
|---|---|---|---|---|
| 202 | D-2 | P-4 | 12 g | Vinyloleate |
| 203 | D-3 | P-5 | 14 g | Octadecyl vinyl ether |
| 204 | D-4 | P-6 | 12 g | Hexadecylmethacrylate |
| 205 | D-5 | P-9 | 12 g | CH$_2$=C(CH$_3$)—COO(CH$_2$)$_2$OCO(CH$_2$)$_2$COOC$_6$ |

TABLE 4-continued

| Production Example | Resin Particles (D) | Resin (P) (PA) | Monomer (B) | |
|---|---|---|---|---|
| 206 | D-6 | P-11 | 11 g | $CH_2=C(CH_3)-COOCH_2CHCH_2OCOC_5H_{11}$ with $OCOC_5H_{11}$ substituent |
| 207 | D-7 | PA-1 | 11 g | $CH_2=CH-COOCH_2CHCH_2COOC_6H_{13}$ with $OCOCH_3$ substituent |
| 208 | D-8 | PA-4 | 11 g | $CH_2=CH-C_6H_4-COOC_{16}H_{33}$ |
| 209 | D-9 | PA-10 | 12 g | $CH_2=C(CH_3)-COOCH_2CH_2CHCH_2COOC_5H_{11}$ with $OCOC_2H_5$ substituent |
| 210 | D-10 | PA-12 | 12 g | $CH_2=C(CH_3)-COO(CH_2)_{10}COOC_{11}H_{23}$ |
| 211 | D-11 | PA-14 | 12 g | Eicosanylmethacrylate |

The rate of polymerization of the resulting latex particles was 88% to 95%, the average particle size was within the range of 0.15 μm to 0.25 μm, and the monodispersibility was good.

The Mw of the respective resin particles was within the range of $8 \times 10^4$ to $2 \times 10^5$, and the Tg was within the range of 36° C. to 39° C.

PRODUCTION EXAMPLE 212
Latex Particles (D-12)

A mixed solution of 14 g of the resin for dispersion stabilization (PA-4) and 177 g of Isoper H was heated to a temperature of 60° C. with stirring under a steam of nitrogen. A mixed solution of 30 g of methyl methacrylate, 70 g of methyl acrylate, 0.6 g of octadecyl acrylate, 200 g of Isoper G and 1.0 g of A.I.V.N. was added dropwise thereto for 2 hours, and the mixture was stirred as such for 2 hours. Further, 0.5 g of A.I.V.N. was added thereto, and the temperature was elevated to 85° C., followed by stirring for 3 hours. After cooling, the product was passed through a 200-mesh nylon cloth. The resulting white dispersion was a latex having a rate of polymerization of 100% and an average particle size of 0.22 μm. The particle size was measured with a CAPA-500 (manufactured by Horiba, Ltd.).

The Mw of the resin particles was $3 \times 10^5$, and the Tg thereof was 28° C.

PRODUCTION EXAMPLE 213 TO 221
Latex Particles (D-13) to (D-21)

Latex particles (D-13) to (D-21) of the present invention were produced in the same manner as in Production Example 212 with the exception that compounds described in Table 5 shown below were each used in place of the monomer (A) (namely, methyl methacrylate and methyl acrylate), the monomer (C) (namely, octadecyl acrylate) and the resin for dispersion stabilization (PA-4) used in Production Example 212.

TABLE 5

| Production Ex. | Latex Particles (D) | Monomer (A) | | Resin (P) (PA) | | Monomer (B) | | Resin Particles Tg |
|---|---|---|---|---|---|---|---|---|
| 213 | D-13 | Methylmethacrylate<br>Ethylacrylate | 50 g<br>50 g | PA-6 | 15 g | $CH_2=CH-CONH(CH_2)_3COOC_{13}H_{27}$ | 1.2 g | 27° C. |
| 214 | D-14 | Methylmethacrylate<br>Methylacrylate | 25 g<br>75 g | PA-4 | 14 g | Octadecyl-α-chloroacrylate | 0.6 g | 26° C. |
| 215 | D-15 | Methylmethacrylate<br>Methylacrylate | 25 g<br>75 g | PA-15 | 13 g | Tetradecyl-α-cyanoacrylate | 0.5 g | 27° C. |
| 216 | D-16 | Methylmethacrylate<br>Methylacrylate | 25 g<br>75 g | PA-16 | 14 g | $CH_2=CH-COOCH_2CHCH_2NH(CH_2)_2OCO_8H_{17}$ with $OCOCH_3$ substituent | 0.4 g | 26° C. |

TABLE 5-continued

| Production Ex. | Latex Particles (D) | Monomer (A) | | Resin (P) (PA) | Monomer (B) | | Resin Particles Tg |
|---|---|---|---|---|---|---|---|
| 217 | D-17 | Ethylmethacrylate<br>Ethylacrylate | 45 g<br>55 g | P-2<br>15 g | $CH_2{=}CH{-}COO(CH_2)_4SO_2N{\bigg\langle}{{C_8H_{17}}\atop{C_2H_5}}$ | 1.5 g | 25° C. |
| 218 | D-18 | Ethylmethacrylate<br>Methylacrylate | 60 g<br>40 g | P-3<br>14 g | Dodecylacrylate<br>$CH_2{=}\underset{\underset{CH_3}{\vert}}{C}{-}COO(CH_2)_2OCOCH{=}CHCOOC_6H_{13}$ | 0.5 g<br>0.4 g | 28° C. |
| 219 | D-19 | Methylmethacrylate<br>2-Cyanoethylacrylate<br>Methylacrylate | 20 g<br>8 g<br>72 g | PA-9<br>13 g | $CH_2{=}\underset{\underset{Cl}{\vert}}{C}{-}COO(CH_2)_2OCO(CH_2)_3COOC_9H_{19}$ | 0.9 g | 30° C. |
| 220 | D-20 | Vinylacetate<br>Styrene<br>Vinylpropionate | 80 g<br>10 g<br>10 g | P-13<br>12 g | $CH_2{=}\underset{\underset{CH_3}{\vert}}{C}{-}COO(CH_2)_{10}COOC_4H_9$ | 1.2 g | 34° C. |
| 221 | D-21 | Methylmethacrylate<br>Acrylic acid<br>Methylacrylate | 20 g<br>5 g<br>75 g | PA-19<br>13 g | Docosanylacrylate | 0.7 g | 32° C. |

The rate of polymerization of the resulting latex particles was 95% to 100%, the average particle size was within the range of 0.18 μm to 0.25 μm, and the monodispersibility was good.

The Mw of the respective resin particles was within the range of $1{\times}10^5$ to $3{\times}10^5$.

PRODUCTION EXAMPLE 222
Latex Particles (D-22)

Latex particles (D-22) of the present invention were produced in the same manner as in Production Example 201 with the exception that 0.8 g of octadecyl methacrylate used as the monomer (C) in Production Example 201 was excluded.

The rate of polymerization of the resulting latex particles was 95%, and the average particle size was 0.21 μm.

The Mw of the resin particles was $1{\times}10^5$, and the Tg was 38° C.

EXAMPLE 1
Preparation of Lithographic Printing Plate Precursor

Composition 1 having the following contents was placed in a paint shaker (manufactured by Toyo Seiki Co., Ltd.) together with glass beads, and dispersed for 60 minutes. Then, the glass beads were filtered off to obtain a dispersion.
Composition 1

| | |
|---|---|
| Gelatin | 10 g |
| Silica: Silysia 310 (manufactured by Fuji Silysia Chemical Co., Ltd.) | 3 g |
| 20% Solution of Colloidal Silica: (Snowtex C) (manufactured by Nissan Chemical Industries, Ltd.) | 12.5 g |
| Alkyl Ester Fluoride FC 430 (manufactured by 3M Co.) | 0.8 g |
| Hardening Compound [$CH_2{=}CHSO_2CH_2CONH(CH_2)_3NHCOCH_2SO_2CH{=}CH_2$] | 0.24 g |
| Water | 54 g |

Using a support of Metalme 100TS comprising a PET film having a thickness of 100 μm having provided thereon a vaporized aluminum layer, the above-mentioned composition was applied onto the support by use of a wire bar and dried at 100° C. for 10 minutes to form an image receiving layer having an amount coated of 15 g/m², thereby obtaining a precursor for lithographic printing. The Beck smoothness of the surface was 300 (second/10 ml), and the contact angle with water thereof was 0 degree.

Preparation of Oil-Based Ink (IK-1)

Ten grams of dodecyl methacrylate/acrylic acid copolymer (copolymerization ratio: 95/5 by weight ratio), 10 g of Alkali Blue and 30 g of Shellsol 71 were placed in a paint shaker (manufactured by Tokyo Seiki Co., Ltd.) together with glass beads, and dispersed for 4 hours to obtain a fine dispersion of Alkali Blue.

Fifty grams (as a solid amount) of latex particles (D-1) of Production Example 101, 10 g of the above-mentioned Alkali Blue dispersion, and 0.10 g of an octadecene-half maleic acid octadecylamide copolymer were diluted with 1 liter of Isoper G, thereby obtaining blue oil-based ink.

A servo plotter, DA8400, manufactured by Graphtech Co., which can write an output from a personal computer, was converted so that the ink discharge head shown in FIG. 2 was mounted on a pen plotter section, and the precursor for lithographic printing prepared as described above was placed on a counter electrode spaced at 1.5 mm. Printing was performed on the precursor for lithographic printing by use of oil-based ink (IK-1) described above to conduct processing.

Successively, heating was carried out for 10 seconds by use of a Ricoh Fuser Model 592 (manufactured by Ricoh Co., Ltd.), adjusting the surface temperature of an ink image surface to 65° C., thereby sufficiently fixing an image area.

A copied image of the resulting processed material (namely, the printing plate) was visually observed under an optical microscope at a magnification of 200×. As a result, the copied image had no problem, fine lines and fine letters were good, abnormalities such as blurs, missing and dullness were not observed, and contamination was not observed-in a non-image area.

Using as a damping solution a solution prepared by diluting SLM-OD (manufactured by Mitsubishi Paper Mill, Ltd.) 50 times with water, and Oliver 94 type (manufactured by Sakurai Seisakusho Co., Ltd.) as a printing material, this printing precursor was printed with a black ink for offset printing.

As a result, 3000 sheets or more of printed material having clear images in which no toning was developed were obtained.

Then, using the above-mentioned ink jet printer, an ink jet test was made. As a result, stable ink jet was obtained even after an elapse of 800 hours. The ink stored at room temperature for 6 months showed no development of aggregates, and gave stable ink jet in the same jet test as described above.

When the processed printing plate under these conditions was actually printed, 3000 sheets or more of printed material having clear images in which no toning was developed were obtained.

Furthermore, the redispersibility of the ink was evaluated under enforced conditions. That is, the discharge head used in the above-mentioned printer was filled with the ink, taken away and allowed to stand at 35° C. for 3 days. Then, the discharge head was immersed in Isoper G for 3 minutes, followed by mild stirring. Thereupon, ink (IK-1) was all removed from the inside of the slit. That is, this is considered to be caused by that the ink (IK-1) adhered to the leading edge of the slit of the discharge head in the non-fluid state by standing was easily redispersed by the salvation with the dispersing medium.

COMPARATIVE EXAMPLE A

Comparative Example A was conducted in the same manner as in Example 1 with the exception that oil-base ink (IKR-1) described below was used in place of oil-based ink (IK-1) used in Example 1.

Oil-Based Ink (IKR-1) for Comparison

Oil-base ink (IKR-1) was prepared in the same manner as in oil-based ink (IK-1) with the exception that 50 g (as a solid amount) of latex particles (D-22) for comparison was used in place of latex particles (D-1) used in oil-based ink (IK-1).

When the lithographic printing plate obtained in Comparative Example A described above were first printed, 3000 sheets or more of printed material having clear images in which no toning was developed were obtained. However, in the ink jet test, the ink in Comparative Example A became unstable in ink jet after an elapse of about 100 hours. Furthermore, in the ink in Comparative Example A after 6 months of storage, coagulated precipitates were deposited, and were not redispersed even on shaking.

Furthermore, in Comparative Example A, the enforced test of the ink redispersibility was made under the same conditions with Example 1. As a result, deposits remained in the slit of the discharge head section.

EXAMPLES 2 TO 8

Using wood free paper having a basis weight of 100 g/m² as a substrate, one surface of the substrate was coated with a coating for a backcoat layer having the following composition using a wire bar to form the under layer having a dry amount coated of 12 g/m². The smoothness of the surface of the backcoat layer was 50 second/10 ml, and adjusted to 1500 (second/10 ml) by a calender treatment. coating for Backcoat Layer:

| | |
|---|---|
| lin (50% water dispersion) | 200 parts |
| yvinyl alcohol solution (10%) | 60 parts |
| Latex (solid: 50%, Tg 0° C.) | 100 parts |
| amine resin (solid: 80%, irez resin SR-613) | 5 parts |

The other surface of the substrate was further coated with coatings A–G for an under layer having the following composition shown in Table 6 using a wire bar to form the under layer having a dry amount coated of 10 g/m². Then, a calender treatment was conducted, establishing the calender conditions so that the smoothness of the backcoat layer is adjusted to about 1500 (second/10 ml). The thus obtained water-resist support Nos. 2–8 was obtained by using the coating formulations A–G, respectively.

TABLE 6

| Formulation | Composition (% by weight) | | | | Support No. |
|---|---|---|---|---|---|
| | Carbon black | Clay | SBR latex | Melamine | |
| A | 0 | 60 | 36 | 4 | 2 |
| B | 3 | 57 | 36 | 4 | 3 |
| C | 5.4 | 54.6 | 36 | 4 | 4 |
| D | 7.2 | 52.8 | 36 | 4 | 5 |
| E | 9 | 51 | 36 | 4 | 6 |
| F | 15 | 45 | 36 | 4 | 7 |
| G | 30 | 30 | 36 | 4 | 8 |

Coating for Under Layer
  Carbon black (30% water dispersion)
  Clay (50% dispersion solution)
  SBR Latex (solid: 50%, Tg 25° C.)
  Melamine resin (solid: 80%, Sumirez resin SR-613)

The above components were mixed according to Table 6, and water was added to adjust the total solid concentration to 25% to obtain coatings A to G for an under layer. 1) Specific Electric Resistance of Under Layer The specific electric resistance of the under layer was measured by the following.

Coatings A to G for the under layer each was coated on a sufficiently desensitized and washed stainless solution. The specific electric resistance of the thus obtained 7 samples were measured by a three terminal process having a gourd electrode according to JIS K-6911. The results are shown in Table 7.

TABLE 7

| Formulation of under layer | Specific electric resistance (Ωcm) |
|---|---|
| A | $2 \times 10^{12}$ |
| B | $1 \times 10^{11}$ |
| C | $4 \times 10^{9}$ |
| D | $1 \times 10^{8}$ |
| E | $7 \times 10^{4}$ |
| F | $5 \times 10^{3}$ |
| G | $4 \times 10^{3}$ |

On support sample Nos. 2 to 8, dispersions having the following composition were coated to form an image receiving layer having a dry amount coated of 6 g/m² to obtain precursor samples for lithographic printing Nos. 2 to 8, respectively.

By using sample Nos. 2 to 8 of the thus prepared precursor for lithographic printing, processing was carried out with oil-based ink (IK-1) in the same manner as in Example 1. In processing, the under layer provided directly under the image receiving layer of sample Nos. 2 to 8 of the precursor for lithographic printing and a counter electrode was electrically connected using silver paste.

After the above processing, in a fully automatic printer (AM-2850, produced by AM Co., Ltd.), a solution obtained by 100 times diluting EU-3 (PS plate processing agent, produced by Fuji Photo Film Co., Ltd.) was added as damping water into a dish for damping water, and the processed material was inserted into the printer by using a black ink for offset printing.

The image quality of the thus obtained drawn image of the processing material was evaluated as follows. The results are shown in Table 8.

TABLE 8

| Example | Precursor Sample No. | Property Image quality of the processed material | Printable number in printing |
|---|---|---|---|
| 2 | 2 | Bad | 50 |
| 3 | 3 | Bad | 100 |
| 4 | 4 | Good | 1500 |
| 5 | 5 | Very good | 3000 |
| 6 | 6 | Very good | 3000 |
| 7 | 7 | Very good | 3000 |
| 8 | 8 | Very good | 3000 |

2) Image Quality of Processed Material

A drawn image of the resulting processed material was visually observed under an optical microscope at a magnification of 200×. The results are represented as shown below.

| Very good: | Completely no problem in drawn images, very good fine lines and fine letters |
| Good: | No problem in drawn images, good fine lines and fine letters |
| Bad | Lacking and blurring of fine lines and fine letters |

3) Printed Images the images of the resulting printed material were evaluated in the same manner as the above image quality of the processed material. The printed image qualities have the same results as the processed image qualities.

4) Printability (Run Length)

Printable numbers having no toning of the printed material and lack of the images visually were examined.

By referring to the specific electrical resistance shown in Table 7, the results in Table 8 are considered.

In precursor sample Nos. 2 and 3 having a large specific electrical resistance of $10^{12}$ to $10^{11}$ Ωcm, the resulting images are missed and blurred. As a result of blurring, since the resin layer of the drawn images becomes thin, the printability is poor. On the other hand, in precursor sample Nos. 5 to 8 having a small specific electrical resistance of $10^8$ to $10^2$ Ωcm, the resulting images have no problem, the fine lines and fine letters are very good, and the printability is high.

That is, the results show that the higher the electroconductivity of the under layer of the support directly under the image receiving layer is, the more excellent the processed images and the printed images are.

EXAMPLE 9

Preparation of Lithographic Printing Plate Precursor

Composition 2 having the following contents was placed in a paint shaker (manufactured by Toyo Seiki Co., Ltd.) together with glass beads, and dispersed for 60 minutes. Then, the glass beads were filtered off to obtain a dispersion.

Composition 2

| | |
|---|---|
| Gelatin | 10 g |
| Silica: Silysia 310 (manufactured by Fuji Silysia Chemical Co., Ltd.) | 3 g |
| 10% Solution of Aluminasol (manufactured by Nissan Chemical Industries, Ltd.) | 10.3 g |
| Alkyl Ester Fluoride FC 430 (manufactured by 3M Co.) | 0.8 g |
| Hardening Compound [$CH_2=CHSO_2CH_2CONH(CH_2)_3NHCOCH_2SO_2CH=CH_2$] | 0.30 g |
| Water | 54 g |

Using a support of ELP-IX type master (produced by Fuji Photo Film Co., Ltd.) used as an electrophotographic lithographic printing precursor for light printing, the dispersion of under layer formulation F in Example 7 was applied onto the support to have an amount coated of 6 g/m$^2$, and the above composition was coated by using a wire bar and dried at 100° C. for 10 minutes to form an image receiving layer having an amount coated of 18 g/m$^2$, thereby obtaining a precursor for lithographic printing.

Furthermore, the Beck smoothness of the image receiving layer was 200 (second/10 ml), and the contact angle with water thereof was 0 degree.

Preparation of Oil-Based Ink (IK-2)

Ten grams of poly(dodecyl methacrylate), 10 g of Nigrosine and 30 g of Isoper were placed in a paint shaker (manufactured by Tokyo Seiki Co., Ltd.) together with glass beads, and dispersed for 4 hours to obtain a fine dispersion of Nigrosine.

Fifty grams (as a solid amount) of latex particles (D-15) of Production Example 215, 35 g of the above-mentioned Nigrosine dispersion, and 0.08 g of an octadecyl vinyl ether-half maleic acid dodecylamide copolymer were diluted with 1 liter of Isoper G, thereby preparing black oil-based ink.

Using this printing plate precursor and oil-based ink (IK-2), plate-making processing was conducted, a printing plate was formed and offset printing was performed in the same manner as in Example 1.

The resulting printed material had clear image quality with no stain in a non-image area, similarly to the printed material of Example 1, and the press life thereof was as good as 3000 sheets or more.

Furthermore, similarly to Example 1, the ink jet-test for 1000 hours and the enforced test of the redispersibility also showed the same good performance as that of ink (IK-1).

EXAMPLES 10 to 23

Plate-making processing and printing were conducted in the same manner as in Example 1 with the exception that oil-based ink described in Table 9 shown below was used in place of oil-based ink (IK-1). The oil-based ink used was prepared in the same manner as in oil-based ink (IK-1) with the exception that 45 g (as a solid amount) of latex particles described Table 9 shown below were used in place of latex particles (D-1)

TABLE 9

| Example | Oil-based Ink | Latex Particles (L) |
|---|---|---|
| 10 | IK-3 | D-2 |
| 11 | IK-4 | D-3 |
| 12 | IK-5 | D-4 |
| 13 | IK-6 | D-5 |
| 14 | IK-7 | D-6 |
| 15 | IK-8 | D-7 |
| 16 | IK-9 | D-8 |
| 17 | IK-10 | D-13 |
| 18 | IK-11 | D-14 |
| 19 | IK-12 | D-15 |
| 20 | IK-13 | D-17 |
| 21 | IK-14 | D-19 |
| 22 | IK-15 | D-20 |
| 23 | IK-16 | D-16 |

The resulting printed material had clear image quality with no stain in a non-image area, similarly to the printed material of Example 1, and the press life thereof was as good as 3000 sheets or more.

Furthermore, similarly to Example 1, the ink jet test for 1000 hours and the enforced test of the redispersibility also showed the same good performance as that of ink (IK-1)

EXAMPLE 24

Plate-making processing and printing were carried out in the same manner as in Example 9, provided, that oil-based ink (IK-17) described below was used in place of oil-based ink (IK-2) used in Example 9. Oil-Based Ink (IK-17):

A mixture of 500 g of white dispersion (D-11) obtained in Production Example 211 and 7.5 g of Sumikaron Black was heated to a temperature of 100° C., and stirred for 6 hours under heating. After cooling to room temperature, the product was passed through a 200-mesh nylon cloth to remove the remaining dye, thereby obtaining a black resin dispersion having an average particle size of 0.22 μm.

Then, 250 g of the above-mentioned black resin dispersion and 0.4 g of charge regulating agent (CD-3) shown below were diluted with 1 liter of Isoper G, thereby preparing black oil-based ink. CD-3

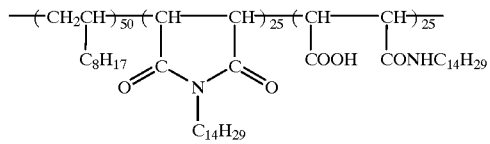

(molar composition ratio)

The resulting printed material had clear image quality with no stain in a non-image area, similarly to the printed material of Example 9, and the press life thereof was as good as 5000 sheets or more.

Furthermore, similarly to Example 2, the ink jet test for 1000 hours and the enforced test of the redispersibility also showed the same good performance as that of ink (IK-1).

EXAMPLE 25

Plate-making processing and printing were carried out in the same manner as in Example 1, provided that oil-based ink (IK-18) described below was used in place of oil-based ink (IK-1) used in Example 1.
Oil-Based Ink (IK-18)

A mixture of 300 g of white dispersion (D-21) obtained in Production Example 221 and 5 g of Victoria Blue B was heated to a temperature of 100° C., and stirred for 6 hours under heating. After cooling to room temperature, the product was passed through a 200-mesh nylon cloth to remove the remaining dye, thereby obtaining a blue resin dispersion having an average particle size of 0.20 μm.

Then, 260 g of the above-mentioned blue resin dispersion and 0.07 g of zirconium naphthenate were diluted with 1 liter of Shellsol 71, thereby preparing blue oil-based ink.

The resulting printed material had clear image quality with no stain in a non-image area, similarly to the printed material of Example 1, and the press life thereof was as good as 3000 sheets or more.

Furthermore, similarly to Example 1, the ink jet test for 1000 hours and the enforced test of the redispersibility also showed the same good performance as that of ink (IK-1).

EXAMPLE 26

Preparation of Lithographic Printing Plate Precursor

Composition 3 having the following contents was placed in a paint shaker together with glass beads, and dispersed for 60 minutes. Then, the glass beads were filtered off to obtain a dispersion.

Composition 3

| | |
|---|---|
| Silica: Silysia 310 (manufactured by Fuji Silysia Chemical Co., Ltd.) | 40 g |
| 20% Solution of Colloidal Silica: (Snowtex C) (manufactured by Nissan Chemical Industries, Ltd.) | 200 g |
| 50% Clay Dispersion | 40 g |
| 10% Solution of Polyvinyl Alcohol (manufactured by Kuraray Co., Ltd.) | 120 g |
| Melamine Resin | 2.0 g |
| Sodium Chloride | 0.2 g |
| Water | 50 g |

Using a support in Example 8, the above-mentioned dispersion was applied onto the support by use of a wire bar and dried to form an image receiving layer having an amount coated of 20 g/m², thereby obtaining a precursor for lithographic printing. The Beck smoothness of the image receiving layer was 150 (second/10 ml), and the contact angle with water thereof was 0 degree.

The precursor was processed in the same manner as in Example 8 to form a printing plate, and offset printing was carried out.

The resulting printed material had clear image quality with no stain in a non-image area, similarly to the printed material of Example 8, and the press life thereof was as good as 5000 sheets or more.

EXAMPLES 27 to 36

Plate-making processing and printing were conducted in the same manner as in Example 9 with the exception that oil-based ink described in Table 9 shown below was used in place of oil-based ink (IK-1). The oil-based ink used was prepared in the same manner as in oil-based ink (IK-1) with the exception that 45 g (as a solid amount) of latex particles described Table 9 shown below were used in place of latex particles (D-1).

TABLE 10

| Example | Oil-based Ink | Latex Particles (L) |
|---|---|---|
| 27 | IK-3 | D-6 |
| 28 | IK-4 | D-9 |
| 29 | IK-5 | D-10 |
| 30 | IK-6 | D-11 |
| 31 | IK-7 | D-1 |
| 32 | IK-8 | D-13 |
| 33 | IK-9 | D-16 |
| 34 | IK-10 | D-17 |
| 35 | IK-11 | D-18 |
| 36 | IK-12 | D-2 |

The resulting printed material had clear image quality with no stain in a non-image area, similarly to the printed material of Example 9, and the press life thereof was as good as 3000 sheets or more.

Furthermore, similarly to Example 1, the ink jet test for 1000 hours and the enforced test of the redispersibility also showed the same good performance as that of ink (IK-1).

PRODUCTION EXAMPLE 301

Macromonomer (MA-1)

A mixed solution of 100 g of octadecyl methacrylate, 2 g of 3-mercaptopropionic acid and 200 g of toluene was heated to a temperature of 70° C. with stirring under a steam of nitrogen. Then, 0.5 g of A.I.B.N. was added as a polymerization initiator thereto to conduct a reaction for 3 hours, 0.5 g of A.I.B.N. was further added to conduct the reaction for 3 hours, and 0.3 g of A.I.B.N. was still further added to conduct the reaction for 3 hours. Then, 8 g of glycidyl methacrylate, 1.0 g of N,N-dimethyldodecylamine and 0.5 g of t-butylhydroquinone were added to the reaction solution, and stirred at a temperature of 100° C. for 10 hours. After cooling, the reaction solution was reprecipitated in 2 liter of methanol to obtain 82 g of a white powder. The weight average molecular weight (Mw) of the polymer was $1 \times 10^4$ (the weight average molecular weight indicates a value converted to polystyrene by the G.P.C. method). Macromonomer (MA-1)

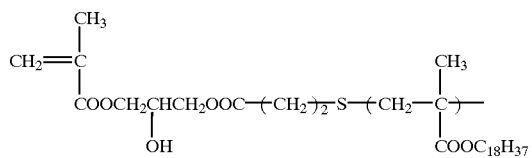

PRODUCTION EXAMPLES 302 to 311

Macromonomers (MA-2) to (MA-11)

Macromonomers (MA-2) to (MA-11) were synthesized in the same manner as in Production Example 301 of macromonomer (MA) with the exception that only octadecyl methacrylate is replaced by compounds corresponding to the following Table 11 in Production Example 301. The weight average molecular weight of each macromonomer obtained ranged from $9 \times 10^3$ to $1 \times 10^4$.

TABLE 11

$$CH_2=\underset{\underset{COOCH_2CHCH_2OOC-(CH_2)_2S-(CH-\overset{a_2}{C})-}{|}}{\overset{CH_3}{|}}$$
$$\phantom{CH_2=C-COOCH_2CHCH_2OOC-(CH_2)_2S-(CH}OH\phantom{---)XXXXXX}X$$

| Production Example | Macromonomer (MA) | $a_1/a_2$ | X |
|---|---|---|---|
| 302 | MA-2 | —H/—CH$_3$ | COOC$_{12}$H$_{25}$ |
| 303 | MA-3 | —H/—CH$_3$ | COOC$_{13}$H$_{27}$ |
| 304 | MA-4 | —H/—CH$_3$ | COOC$_{16}$H$_{33}$ |
| 305 | MA-5 | —H/—H | COOC$_{18}$H$_{37}$ |
| 306 | MA-6 | —H/—CH$_3$ | —(CH$_2$)$_2$OCO(CH$_2$)$_2$COOC$_2$H$_5$ |
| 307 | MA-7 | —H/—CH$_3$ | —(CH$_2$)$_2$OCO(CH$_2$)$_3$COOCH$_3$ |
| 308 | MA-8 | —H/—H | —(CH$_2$)$_2$OCOCH=CH—COOC$_5$H$_{11}$ |
| 309 | MA-9 | —H/—H | —CH$_2$CHCH$_2$OCOC$_6$H$_{13}$<br>\|<br>OCOC$_6$H$_{13}$ |
| 310 | MA-10 | —H/—CH$_3$ | —CH$_2$CHCH$_2$OCOC$_5$H$_{11}$<br>\|<br>OCOCH$_3$ |
| 311 | MA-11 | —H/—H | —(CH$_2$)$_2$OCO(CH$_2$)$_2$SO$_2$C$_8$H$_{17}$ |

PRODUCTION EXAMPLE 312

Macromonomer (MA-12)

A mixed solution of 100 g of tetradecyl methacrylate, 2 g of thioethanol and 200 g of toluene was heated to a temperature of 70° C. with stirring under a steam of nitrogen. Then, 1.0 g of A.I.B.N. was added as a polymerization initiator thereto to conduct a reaction for 4 hours, 0.5 g of A.I.B.N. was further added to conduct the reaction for 3 hours, and then, 0.3 g of A.I.B.N. was still further added to conduct the reaction for 3 hours. The reaction solution was cooled to room temperature, and 8 g of 2-carboxyethyl acrylate was added thereto. Then, a mixed solution of 12.7 g of dicyclohexylcarbodiimide (referred to as "D.C.C." simply) and 60 g of methylene chloride was added dropwise thereto for 1 hour. Then, 1.0 g of t-butylhydroquinone was added, followed by stirring as such for 4 hours.

Crystals deposited were filtered off, and the resulting filtrate was reprecipitated in 2 liters of methanol. The precipitated oily product was collected by decantation, dissolved in 150 ml of methylene chloride, and reprecipitated again in 1 liter of methanol. The oily product was collected, and dried under reduced pressure to obtain a polymer having a Mw of $8 \times 10^3$ in a yield of 60 g.

Macromonomer (MA-12)

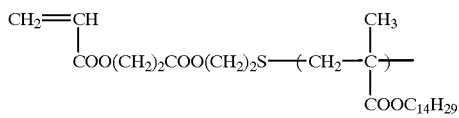

PRODUCTION EXAMPLES 313 to 315

Macromonomers (MA-13) to (MA-15)

Macromonomers shown in the following Table 12 were each produced in the same manner as in Production Example 312 described above with the exception that a methacrylate monomer (corresponding to tetradecyl methacrylate) and an unsaturated carboxylic acid (corresponding to 2-carboxyethyl methacrylate) were each replaced in Production Example 312. The weight average molecular weight of each macromonomer obtained in a yield of 60 to 70 g ranged from $7 \times 10^3$ to $9 \times 10^3$.

TABLE 12

| Production Example | Macro-monomer (MA) | Chemical Structure of Micromonomer (MA) |
|---|---|---|
| 313 | MA-13 | $CH_2{=}C(Cl){-}COO(CH_2)_2S{-}(CH_2{-}C(CH_3)(COOC_{20}H_{41}){-})_n$ |
| 314 | MA-14 | $CH_2{=}C(CN){-}COO(CH_2)_2S{-}[(CH_2{-}C(CH_3)(COOC_{12}H_{25}){-})_{50}(CH_2{-}CH(COOC_{18}H_{37}){-})_{50}]$ (Weight ratio) |
| 315 | MA-15 | $CH_2{=}CH{-}C_6H_4{-}COO(CH_2)_2S{-}(CH_2{-}C(CH_3)(COO(CH_2)_2OCOC_{10}H_{21}){-})_n$ |

PRODUCTION EXAMPLE 316

Macromonomer (MA-16)

A mixed solution of 100 g of 2,3-dihexanoyloxy methacrylate, 150 g of tetrahydrofuran and 50 g of isopropyl alcohol was heated to a temperature of 75° C. under a steam of nitrogen. Then, 5.0 g of 4,4'-azobis(4-cyanovaleric acid) (referred to as "A.C.V." simply) was added as a polymerization initiator thereto to conduct a reaction for 5 hours, and 1.0 g of A.C.V. was further added to conduct the reaction for 4 hours. After cooling, the reaction solution was reprecipitated in 1.5 liter of methanol, and the oily product was collected by decantation and dried under reduced pressure. The yield was 85 g.

A mixture of 80 g of this oily product, 15 g of glycidyl methacrylate, 1.0 g of N,N-dimethyldodecylamine, 1.0 g of 2,2'-methylenebis(6-t-butyl-p-cresol) and 100 g of toluene was stirred at a temperature of 100° C. for 15 hours. After cooling, the reaction solution was reprecipitated in 1 liter of petroleum ether to obtain 63 g of a white powder. The weight average molecular weight was $7 \times 10^3$.

Macromonomer (MA-116)

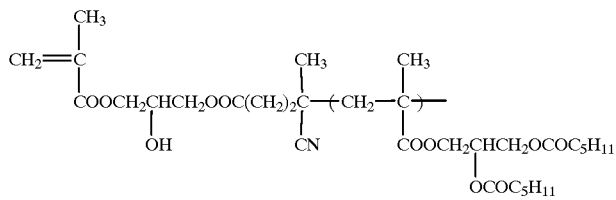

PRODUCTION EXAMPLE 401

Latex Particles (L-1)

A mixed solution of 12 g of resin for dispersion stabilization (P-1), 100 g of vinyl acetate, 1.0 g of macromonomer (MA-1) and 348 g of Isoper H was heated to a temperature of 60° C. with stirring under a steam of nitrogen. As a polymerization initiator, 0.8 g of A.I.V.N. was added thereto to conduct a reaction for 3 hours, and 0.8 g of A.I.V.N. was further added to conduct the reaction for 2 hours. Successively, 0.5 g of A.I.B.N. was added thereto, followed to conduct the reaction for 3 hours by heating to a temperature of 80° C. Then, the temperature was elevated to 100° C. and the resulting product was stirred for 2 hours to remove unreacted monomers by distillation. After cooling, the product was passed through a 200-mesh nylon cloth. The resulting white dispersion was a latex having a rate of polymerization of 98% and an average particle size of 0.20 μm. The particle size was measured with CAPA-500.

The above-mentioned white dispersion was partly centrifuged (the number of revolutions: $1 \times 10^4$ r.p.m., revolution time: 1 hour), and the sedimented resin particles were collected and dried. Then, the weight average molecular weight (Mw) and the glass transition temperature (Tg) of the resin particles were measured. As a result, the Mw was $8 \times 10^4$ (a value converted to polystyrene by G.P.C.), and the Tg was 38° C.

PRODUCTION EXAMPLES 402 to 415

Latex Particles (L-2) to (L-15)

Latex particles (L-2) to (L-15) of the present invention were produced in the same manner as in Production Example 401 described above with the exception that resins for dispersion stabilization (P) and macromonomers (MA) described in Table 13 shown below were each used in place of resin for dispersion stabilization (P-1) and macromonomer (MA-1) in Production Example 401.

TABLE 13

| Production Example | Latex Particles (L) | Resin (P) (PA) | | Macromonomer (MA) | |
|---|---|---|---|---|---|
| 402 | L-2 | P-2 | 10 g | MA-2 | 1.5 g |
| 403 | L-3 | P-4 | 10 g | MA-3 | 1.5 g |
| 404 | L-4 | P-5 | 11 g | MA-4 | 1.0 g |
| 405 | L-5 | P-7 | 10 g | MA-6 | 2.0 g |
| 406 | L-6 | P-10 | 10 g | MA-7 | 2.5 g |
| 407 | L-7 | P-14 | 10 g | MA-8 | 2.0 g |
| 408 | L-8 | PA-8 | 9 g | MA-5 | 0.8 g |
| 409 | L-9 | PA-12 | 10 g | MA-10 | 1.0 g |
| 410 | L-10 | PA-14 | 9 g | MA-15 | 2.5 g |
| 411 | L-11 | PA-15 | 9 g | MA-11 | 1.5 g |

TABLE 13-continued

| Production Example | Latex Particles (L) | Resin (P) (PA) | | Macromonomer (MA) | |
|---|---|---|---|---|---|
| 412 | L-12 | PA-17 | 8 g | MA-9 | 3.0 g |
| 413 | L-13 | PA-18 | 10 g | MA-5 | 1.5 g |
| 414 | L-14 | PA-19 | 8 g | MA-2 | 2.5 g |
| 415 | L-15 | P-11 | 10 g | MA-9 | 2.0 g |

The rate of polymerization of each latex particles thus obtained was 88% to 95%, the average particle size thereof ranged from 0.15 μm to 0.25 μm, and the monodispersibility was good.

The Mw of each resin particles ranged from $8 \times 10^4$ to $2 \times 10^5$, and the Tg thereof ranged from 36 to 39° C.

PRODUCTION EXAMPLE 416

Latex Particles (L-16)

A mixed solution of 13 g of resin for dispersion stabilization (PA-1) and 177 g of Isoper H was heated to a temperature of 60° C. with stirring under a steam of nitrogen. As a polymerization initiator, a mixed solution of 30 g of methylmethacrylate, 70 g of methylacrylate, 1.0 g of macromonomer (MA-14), 200 g of Isoper G and 1.0 g of A.I.V.N. was added dropwise thereto with 2 hours and stirred for 2 hours. After cooling, the product was passed through a 200-mesh nylon cloth. The resulting white dispersion was a latex having a rate of polymerization of 100% and an average particle size of 0.22 μm. The particle size was measured with CAPA-500.

The above-mentioned white dispersion was partly centrifuged (the number of revolutions: $1 \times 10^4$ r.p.m., revolution time: 1 hour), and the sedimented resin particles were collected and dried.

The Mw was $3 \times 10^5$, and the Tg was 28° C.

PRODUCTION EXAMPLES 417 to 427

Latex Particles (L-17) to (L-27)

Latex particles (L-17) to (L-27) of the present invention were produced in the same manner as in Production Example 416 with the exception that compounds described in Table 14 shown below were each used in place of monomers (A) (namely, methyl methacrylate and methyl acrylate), macromonomer (MA-14) and resin for dispersion stabilization in Production Example 416.

TABLE 14

| Ex[1] | Latex (L) | Monomer (A) | | Resin (P) (PA) | Macromonomer (MA) | | Resin Tg |
|---|---|---|---|---|---|---|---|
| 417 | L-17 | Methylmethacrylate<br>Ethylacrylate | 50 g<br>50 g | PA-3 14 g | MA-13 | 0.8 g | 26° C. |
| 418 | L-18 | Methylmethacrylate<br>Methylacrylate | 25 g<br>75 g | PA-6 13 g | MA-4 | 1.2 g | 26° C. |
| 419 | L-19 | Methymethacrylate<br>Methyacrylate | 25 g<br>75 g | PA-11 10 g | MA-10 | 1.5 g | 27° C. |
| 420 | L-20 | Methymethacrylate<br>Methyacrylate | 25 g<br>75 g | PA-16 13 g | MA-12 | 1.0 g | 26° C. |
| 421 | L-21 | Ethylmethacrylate<br>Methylacrylate | 45 g<br>55 g | P-9 16 g | MA-14 | 1.0 g | 25° C. |
| 422 | L-22 | Ethylmethacrylate<br>Methylacrylate | 60 g<br>40 g | P-11 15 g | MA-12 | 1.8 g | 28° C. |
| 423 | L-23 | Methylmethacrylate<br>2-Cyanoethylacrylate<br>Methylacrylate | 20 g<br>8 g<br>72 g | PA-13 14 g | MA-14 | 2.0 g | 30° C. |
| 424 | L-24 | Vinylacetate<br>Styrene<br>Vinylpropionate | 80 g<br>10 g<br>10 g | P-13 9 g | MA-15 | 3.0 g | 34° C. |
| 425 | L-25 | Methylmethacrylate<br>Acrylic acid<br>Methylacrylate | 20 g<br>5 g<br>75 g | PA-14 15 g | MA-16 | 4.0 g | 33° C. |
| 426 | L-26 | Vinylacetate<br>Crotonic acid<br>Vinylpropionate | 80 g<br>5 g<br>15 g | PA-17 8 g | MA-9 | 4.0 g | 35° C. |
| 427 | L-27 | Vinylacetate<br>N-Vinylpyrrolidone | 95 g<br>5 g | P-14 11 g | MA-11 | 2.0 g | 43° C. |

[1]Production Example

The rate of polymerization of each latex particles thus obtained was 95% to 99%, the average particle size thereof ranged from 0.18 μm to 0.25 μm, and the monodispersibility was good.

The Mw of each resin particles ranged from $8 \times 10^4$ to $2 \times 10^5$.

PRODUCTION EXAMPLE 428

Latex Particles (L-28) (Comparative Example B)

Latex particles (L-28) for comparison were produced in the same manner as in Production Example 401 with the exception that 4 g of macromonomer (MA-1) used in Production Example 401 was eliminated.

The rate of polymerization of the resulting latex particles was 95%, and the average particle size thereof was 0.28 μm.

The Mw of the resin particles was $1 \times 10^5$, and the Tg was 38° C.

EXAMPLE 101

Preparation of Lithographic Printing Plate Precursor

Composition 101 having the following contents was placed in a paint shaker (manufactured by Toyo Seiki Co., Ltd.) together with glass beads, and dispersed for 60 minutes. Then, the glass beads were filtered off to obtain a dispersion.

Composition 101

| | |
|---|---|
| Gelatin | 20 g |
| Silica: Silysia 310 (manufactured by Fuji Silysia Chemical Co., Ltd.) | 3 g |
| 20% Solution of Colloidal Silica: (Snowtex CR503) (manufactured by Nissan Chemical Industries, Ltd.) | 3.8 g |
| Alkyl Ester Fluoride FC 430 (manufactured by 3M Co.) | 0.8 g |
| Hardening Compound [$CH_2$=$CHSO_2CH_2CONH(CH_2)_3NHCOCH_2SO_2CH$=$CH_2$] | 0.24 g |
| Water | 54 g |

Using a support of Metalme 100TS comprising a PET film having a thickness of 100 μm having provided thereon a vaporized aluminum layer, the above-mentioned composition was applied onto the support by use of a wire bar and dried at 100° C. for 10 minutes to form an image receiving layer having an amount coated of 20 g/m², thereby obtaining a precursor for lithographic printing. The Beck smoothness of the surface was 250 (second/10 ml), and the contact angle with water thereof was 0 degree.

Preparation of Oil-Based Ink (IK-101)

Ten grams of dodecyl methacrylate/acrylic acid copolymer (copolymerization ratio: 95/5 by weight ratio), 10 g of Alkali Blue and 30 g of Shellsol 71 were placed in a paint shaker (manufactured by Tokyo Seiki Co., Ltd.) together with glass beads, and dispersed for 4 hours to obtain a fine dispersion of Alkali Blue.

Fifty grams (as a solid amount) of latex particles (L-1) of Production Example 401, 18 g of the above-mentioned Alkali Blue dispersion, and 0.16 g of an octadecene-half maleic acid octadecylamide copolymer were diluted with 1 liter of Isoper G, thereby obtaining blue oil-based ink.

A servo plotter, DA8400, manufactured by Graphtech Co., which can write an output from a personal computer, was converted so that the ink discharge head shown in FIG. 2 was mounted on a pen plotter section, and the precursor for lithographic printing prepared as described above was placed on a counter electrode spaced at 1.5 mm. Printing was performed on the precursor for lithographic printing by use of oil-based ink (IK-101) described above to conduct processing.

Successively, heating was carried out for 10 seconds by use of a Ricoh Fuser Model 592 (manufactured by Ricoh Co., Ltd.), adjusting the surface temperature of an ink image surface to 65° C., thereby sufficiently fixing an image area.

A copied image of the resulting processed material (namely, the printing plate) was visually observed under an optical microscope at a magnification of 200×. As a result, the copied image had no problem, fine lines and fine letters were good, abnormalities such as blurs, missing and dullness were not observed, and contamination was not observed in a non-image area.

Using as a damping solution a solution prepared by diluting SLM-OD (manufactured by Mitsubishi Paper Mill, Ltd.) 50 times with water, and Oliver 94 type (manufactured by Sakurai Seisakusho Co., Ltd.) as a printing material, this printing precursor was printed with a black ink for offset printing.

As a result, 3000 sheets or more of printed material having clear images in which no toning was developed were obtained.

Then, using the above-mentioned ink jet printer, an ink jet test was made. As a result, stable ink jet was obtained even after an elapse of 800 hours. The ink stored at room temperature for 6 months showed no development of aggregates, and gave stable ink jet in the same jet test as described above.

When the processed printing plate under these conditions was actually printed, 3000 sheets or more of printed material having clear images in which no toning was developed were obtained.

Furthermore, the redispersibility of the ink was evaluated under enforced conditions. That is, the discharge head used in the above-mentioned printer was filled with the ink, taken away and allowed to stand at 35° C. for 3 days. Then, the discharge head was immersed in Isoper G for 3 minutes, followed by mild stirring. Thereupon, ink (IK-101) was all removed from the inside of the slit. That is, this is considered to be caused by that the ink (IK-101) adhered to the leading edge of the slit of the discharge head in the non-fluid state by standing was easily redispersed by the solvation with the dispersing medium.

COMPARATIVE EXAMPLE B

Comparative Example B was conducted in the same manner as in Example 101 with the exception that oil-base ink (IKR-101) described below was used in place of oil-based ink (IK-101) used in Example 101.

Oil-Based Ink (IKR-101) for Comparison

Oil-base ink (IKR-101) was prepared in the same manner as in oil-based ink (IK-101) with the exception that 50 g (as a solid amount) of latex particles (L-28) for comparison was used in place of latex particles (L-1) used in oil-based ink (IK-101).

When the lithographic printing plate obtained in Comparative Example A described above were first printed, 3000 sheets or more of printed material having clear images in which no toning was developed were obtained in the same manner as in Example 101. However, in the ink jet test, the ink in Comparative Example A became unstable in ink jet after an elapse of about 100 hours. Furthermore, in the ink in Comparative Example B after 6 months of storage, coagulated precipitates were deposited, and were not redispersed even on shaking.

Furthermore, in Comparative Example A, the enforced test of the ink redispersibility was made under the same conditions as with Example 101. As a result, deposits remained in the slit of the discharge head section.

EXAMPLE 102

Preparation of Lithographic Printing Plate Precursor

Composition 102 having the following contents was placed in a paint shaker (manufactured by Toyo Seiki Co., Ltd.) together with glass beads, and dispersed for 60 minutes. Then, the glass beads were filtered off to obtain a dispersion.

Composition 102

| | |
|---|---|
| Gelatin | 20 g |
| Silica: Silysia 310 (manufactured by Fuji Silysia Chemical Co., Ltd.) | 3 g |
| 10% Solution of Aluminasol (manufactured by Nissan Chemical Industries, Ltd.) | 10.3 g |
| Alkyl Ester Fluoride FC 430 (manufactured by 3M Co.) | 0.8 g |
| Hardening Compound [$CH_2$=$CHSO_2CH_2CONH(CH_2)_3NHCOCH_2SO_2CH$=$CH_2$] | 0.30 g |
| Water | 54 g |

Using a support of ELP-IX type master (produced by Fuji Photo Film Co., Ltd.) used as an electrophotographic lithographic printing precursor for light printing, and the above composition was coated by using a wire bar and dried at 100° C. for 10 minutes to form an image receiving layer having an amount coated of 18 $g/m^2$, thereby obtaining a precursor for lithographic printing.

Furthermore, the Beck smoothness of the image receiving layer was 200 (second/10 ml), and the contact angle with water thereof was 0 degree.

Preparation of Oil-Based Ink (IK-102)

Ten grams of poly(dodecyl methacrylate), 10 g of Nigrosine and 30 g of Isoper H were placed in a paint shaker (manufactured by Tokyo Seiki Co., Ltd.) together with glass beads, and dispersed for 4 hours to obtain a fine dispersion of Nigrosine.

Fifty grams (as a solid amount) of latex particles (L-2) of Production Example 402, 35 g of the above-mentioned Nigrosine dispersion, and 0.08 g of an octadecyl vinyl ether-half maleic acid dodecylamide copolymer were diluted with 1 liter of Isoper G, thereby preparing black oil-based ink.

Using this printing plate precursor and oil-based ink (IK-102), plate-making processing was conducted, a printing plate was formed and offset printing was performed in the same manner as in Example 101.

The resulting printed material had clear image quality with no stain in a non-image area, similarly to the printed material of Example 101, and the press life thereof was as good as 5000 sheets or more.

Furthermore, similarly to Example 1, the ink jet test for 800 hours and the enforced test of the redispersibility also showed the same good performance as that of ink (IK-1).

EXAMPLES 103 to 123

Plate-making processing and printing were conducted in the same manner as in Example 101 with the exception that oil-based ink described in Table 15 shown below was used in place of oil-based ink (IK-101). The oil-based ink used was prepared in the same manner as in oil-based ink (IK-101) with the exception that 45 g (as a solid amount) of latex particles described Table 15 shown below were used in place of latex particles (L-1).

TABLE 15

| Example | Oil-based Ink | Latex Particles (L) |
|---|---|---|
| 103 | IK-103 | L-3 |
| 104 | IK-104 | L-4 |
| 105 | IK-105 | L-5 |
| 106 | IK-106 | L-6 |
| 107 | IK-107 | L-7 |
| 108 | IK-108 | L-8 |
| 109 | IK-109 | L-9 |
| 110 | IK-110 | L-10 |
| 111 | IK-111 | L-11 |
| 112 | IK-112 | L-12 |
| 113 | IK-113 | L-13 |
| 114 | IK-114 | L-14 |
| 115 | IK-115 | L-15 |
| 116 | IK-116 | L-16 |
| 117 | IK-117 | L-17 |
| 118 | IK-118 | L-18 |
| 119 | IK-119 | L-19 |
| 120 | IK-120 | L-20 |
| 121 | IK-121 | L-21 |
| 122 | IK-122 | L-22 |
| 123 | IK-123 | L-23 |

The resulting printed material had clear image quality with no stain in a non-image area, similarly to the printed material of Example 101, and the press life thereof was as good as 3000 sheets or more.

Furthermore, similarly to Example 101, the ink jet test for 800 hours and the enforced test of the redispersibility also showed the same good performance as that of ink (IK-101).

EXAMPLE 115

Using wood free paper having a basis weight of 100 g/m$^2$ as a substrate, one surface of the substrate was coated with a coating for an under layer having the following composition using a wire bar to form the under layer having a dry amount coated of 10 g/m$^2$. The smoothness of the surface of the under layer was 150 (second/10 ml), and adjusted to 1500 (second/10 ml) by a calender treatment.

Coating for Under Layer

| | |
|---|---|
| Silica gel | 10 parts |
| SBR Latex | 92 parts |
| (50 wt % water dispersion, Tg: 25° C.) | |
| Clay (45 wt % water dispersion) | 110 parts |
| Melamine (80 wt % water dispersion) | 5 parts |
| Water | 191 parts |

The other surface of the substrate was further coated with a coating A–G for a backcoat layer having the following composition shown below using a wire bar to form the under layer having a dry amount coated of 12 g/m$^2$. Then, a calender treatment was conducted, establishing the calender conditions so that the smoothness of the backcoat layer is adjusted to about 50 (second/10 ml).

Coating for Backcoat Layer

| | |
|---|---|
| Kaolin (50% water dispersion) | 200 parts |
| Polyvinyl Alcohol | 60 parts |
| SBR Latex (solid: 49%, Tg 0° C.) | 100 parts |
| Primary Condensation Product of Melamine Resin (solid: 80%, Sumirez resin SR-613) | 5 parts |

Plate-making processing and printing were carried out in the same manner as in Example 101 using the precursor for lithographic printing prepared in Example 26, provided that oil-based ink (IK-101) described below was used in place of oil-based ink (IK-124) shown below.

Oil-Based Ink (IK-124)

A mixture of 500 g of white dispersion (L-101) obtained in Production Example 101 of resin particles and 7.5 g of Sumikaron Black was heated to a temperature of 100° C., and stirred for 6 hours under heating. After cooling to room temperature, the product was passed through a 200-mesh nylon cloth to remove the remaining dye, thereby obtaining a black resin dispersion having an average particle size of 0.20 μm.

Then, 250 g of the above-mentioned black resin dispersion and 0.4 g of charge regulating agent (CD-3) shown in Example 24 were diluted with 1 liter of Isoper G, thereby preparing black oil-based ink.

The resulting printed material had clear image quality with no stain in a non-image area, similarly to the printed material of Example 101, and the press life thereof was as good as 5000 sheets or more.

Furthermore, similarly to Example 101, the ink jet test for 800 hours and the enforced test of the redispersibility also showed the same good performance as that of ink (IK-101).

EXAMPLE 125

Plate-making processing and printing were carried out in the same manner as in Example 101, provided that oil-based ink (IK-125) described below was used in place of oil-based ink (IK-101).

Oil-Based Ink (IK-125)

A mixture of 300 g of white dispersion (L-26) obtained in Production Example 426 and 5 g of Victoria Blue B was heated to a temperature of 100° C., and stirred for 6 hours under heating. After cooling to room temperature, the product was passed through a 200-mesh nylon cloth to remove the remaining dye, thereby obtaining a blue resin dispersion having an average particle size of 0.18 μm.

Then, 260 g of the above-mentioned blue resin dispersion and 0.42 g of zirconium naphthenate were diluted with 1 liter of Shellsol 71, thereby preparing blue oil-based ink.

The resulting printed material had clear image quality with no stain in a non-image area, similarly to the printed material of Example 101, and the press life thereof was as good as 3000 sheets or more.

Furthermore, similarly to Example 101, the ink jet test for 800 hours and the enforced test of the redispersibility also showed the same good performance as that of ink (IK-101).

While the invention has been described in detail and with reference to specific embodiments thereof, it will be apparent to one skilled in the art that various changes and modifications can be made therein without departing from the spirit and scope thereof.

What is claimed is:

1. A method for preparing a printing plate by an inkjet process consisting essentially of discharging an oily ink using an electrostatic field on a lithographic printing plate precursor comprising a water-resistant support having provided thereon an image receiving layer having a lithographically printable hydrophilic surface dropwise from a head having a discharge electrode to form an image on the lithographically printable hydrophilic surface, wherein the oily ink comprises resin particles dispersed in a nonaqueous carrier liquid having an electric resistance of 10$^9$ Ωcm or more and a dielectric constant of 3.5 or less, and said resin particles dispersed are copolymer particles obtained by polymerization granulation of a solution comprising (i), (ii) and (iii):

(i) at least one monofunctional monomer (A) which is soluble in a nonaqueous solvent which is at least miscible with said nonaqueous carrier liquid and becomes insoluble therein by polymerization;

(ii) (ii-a) at least one monomer (B) represented by the following formula (I-A) which is copolymerizable with said monomer (A), or (ii-b) at least one monofunctional macromonomer (MA) having a weight average molecular weight of $2 \times 10^4$ or less obtained by combining a polymerizable double bond group represented by the following formula (II-B) with only one end of a main chain of a polymer comprising a repeating unit corresponding to a monomer represented by the following formula (I-B); and (iii) at least one resin for dispersion stabilization (P) which is a polymer comprising a repeating unit represented by the following formula (III), wherein said polymer is crosslinked at a part of its main chain thereof, and said resin (P) is soluble in said nonaqueous solvent:

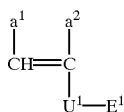

(I-A)

wherein $E^1$ represents an aliphatic group having 8 or more carbon atoms or a substituent having a total number of atoms of 8 or more, provided that hydrogen atoms directly attached to a carbon or nitrogen atom are excluded from the number, represented by the following formula (IV-A):

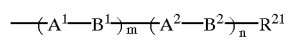

(IV-A)

wherein $R^{21}$ represents a hydrogen atom or an aliphatic group having 1 to 18 carbon atoms;

$B^1$ and $B^2$ are the same or different and each represents —O—, —S—, —CO—, —$CO_2$—, —OCO—, —$SO_2$—, —$N(R^{22})$—, —$CON(R^{22})$—, —$N(R^{22})CO$—, —$N(R^{22})SO_2$—, —$SO_2N(R^{22})$—, —$NHCO_2$— or —NHCONH—, in which $R^{22}$ has the same meaning as $R^{21}$;

$A^1$ and $A^2$ are the same or different and each represents at least one group selected from a group represented by the following formula (IV-Aa) and a hydrocarbon group having 1 to 18 carbon atoms, which each may be substituted, provided that, in the case where $A^1$ or $A^2$ represents two or more groups selected from a group represented by the following formula (IV-Aa) and a hydrocarbon group having 1 to 18 carbon atoms, $A^1$ or $A^2$ represents (1) two or more groups represented by formula (IV-Aa), (2) a combination of at least one group represented by formula (IV-Aa) and at least one hydrocarbon group having 1 to 18 carbon atoms, or (3) two or more hydrocarbon groups having 1 to 18 carbon atoms:

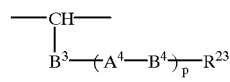

(IV-Aa)

wherein $B^3$ and $B^4$ are the same or different and each has the same meaning as $B^1$ and $B^2$;

$A^4$ represents a hydrocarbon group having 1 to 18 carbon atoms which may be substituted;

$R^{23}$ has the same meaning as $R^{21}$; and m, n and p are the same or different and each represents an integer of 0 to 4, provided that m, n and p are not 0 at the same time;

$U^1$ represents —COO—, —CONH—, —$CON(R^{11})$—, —OCO—, —CONHCOO—, —$CH_2COO$—, —$(CH_2)_k$OCO—, —O—, —$C_6H_4$— or —$C_6H_4$—COO—, in which $R^{11}$ represents an aliphatic group or a substituent represented by formula (IV-A) described above, and k represents an integer of 1 to 4; and $a^1$ and $a^2$ are the same or different and each represents a hydrogen atom, an alkyl group, a halogen atom, a cyano group, —COO—$R^{12}$ or —$CH_2COO$—$R^{12}$, in which $R^{12}$ represents an aliphatic group:

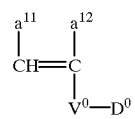

(I-B)

wherein $V^0$ represents —COO—, —OCO—, —$(CH_2)_r$COO—, —$(CH_2)_r$OCO—, —O—, —$SO_2$—, —CONHCOO—, —CONHCONH—, —$CON(D^{11})$—, —$SO_2N(D^{11})$— or a phenylene group, in which $D^{11}$ represents a hydrogen atom or a hydrocarbon group having 1 to 22 carbon atoms, and r represents an integer of 1 to 4;

$a^{11}$ and $a^{12}$ are the same or different and each represents a hydrogen atom, a halogen atom, a cyano group, a hydrocarbon group, —COO—$D^{12}$ or —COO—$D^{12}$ linked through a hydrocarbon group, in which $D^{12}$ represents a hydrogen atom or a hydrocarbon group which may be substituted;

$D^0$ represents a hydrocarbon group having 8 to 22 carbon atoms or a substituent group having a total number of atoms of 8 or more, provided that hydrogen atoms attached to a carbon or nitrogen atom are excluded from the number, represented by the following formula (IV-B):

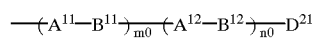

(IV-B)

wherein $D^{21}$ represents a hydrogen atom or an aliphatic group having 1 to 22 carbon atoms;

$B^{11}$ and $B^{12}$ are the same or different and each represents —O—, —CO—, —$CO_2$—, —OCO—, —$SO_2$—, —$N(D^{22})$—, —$CON(D^{22})$—, or —$N(D^{22})CO$—, in which $D^{22}$ has the same meaning $D^{21}$;

$A^{11}$ and $A^{12}$ are the same or different and each represents at least one group selected from a group represented by the following formula (IV-Ba) and a hydrocarbon group having 1 to 18 carbon atoms, which each may be substituted, provided that, in the case where $A^{11}$ or $A^{12}$ represents two or more groups selected from a group represented by the following formula (IV-Ba) and a hydrocarbon group having 1 to 18 carbon atoms, $A^{11}$ or $A^{12}$ represents (1) two or more groups represented by formula (IV-Ba), (2) a combination of at least one group represented by formula (IV-Ba) and at least one hydrocarbon group having 1 to 18 carbon atoms, or (3) two or more hydrocarbon groups having 1 to 18 carbon atoms:

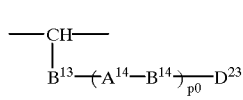
(IV-Ba)

wherein $B^{13}$ and $B^{14}$ are the same or different and each has the same meaning as $B^{11}$ and $B^{12}$;

$A^{14}$ represents a hydrocarbon group having 1 to 18 carbon atoms which may be substituted;

$D^{23}$ has the same meaning as $D^{21}$; and $m^0$, $n^0$ and $p^0$ are the same or different and each represents an integer of 0 to 4, provided that $m^0$, $n^0$ and $p^0$ are not 0 at the same time;

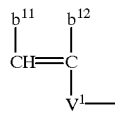
(II-B)

wherein $V^1$ represents —COO—, —CONHCOO—, —CONHCONH—, —CONH— or a phenylene group; and $b^{11}$ and $b^{12}$ are the same or different and each has the same meaning as $a^{11}$ and $a^{12}$ in formula (I-B);

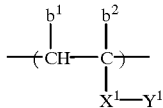
(III)

wherein $X^1$ represents —COO—, —OCO—, —CH$_2$OCO—, —CH$_2$COO—, —O— or —SO$_2$—;

$Y^1$ represents an aliphatic group having 10 to 32 carbon atoms; and $b^1$ and $b^2$ are the same or different and have the same meaning as $a^1$ and $a^2$ in formula (I-A) or $a^{11}$ and $a^{12}$ in formula (I-B);

wherein the support has a specific electric resistance of $10^{10}$ Ωcm or less at least at an area directly under the image receiving layer, wherein said resin particles dispersed in the oily ink are electrically detectable particles positively or negatively charged, wherein the lithographically printable hydrophilic surface faces the discharge electrode, and a counter electrode is provided on the opposite side thereof.

2. The method as claimed in claim 1, wherein said water-resistant support is a support having a specific electric resistance of $10^{10}$ Ωcm or less as a whole of the support.

3. The method as claimed in claim 1, wherein said resin for dispersion stabilization (P) contains at least one polar group selected from the group consisting of —PO$_3$H$_2$, —SO$_3$H, —COOH, —P(=O)(OH)R$^1$, —OH, a formyl group, —CONR$^3$R$^4$, —SO$_2$NR$^3$R$^4$, a cyclic acid anhydride-containing group and an amino group at one end of at least one main chain of the polymer, in which R$^1$ represents a hydrocarbon group or —OR$^2$; R$^2$ represents a hydrocarbon group; and R$^3$ and R$^4$ are the same or different and each represents a hydrogen atom or a hydrocarbon group.

* * * * *